United States Patent
Habibollahzadeh et al.

(10) Patent No.: US 12,300,285 B1
(45) Date of Patent: May 13, 2025

(54) MEASURING NFT PROTRUSION IN A HEAT ASSISTED MAGNETIC RECORDING DRIVE USING BURST WRITING AND A CONSTANT LASER DIODE TEMPERATURE

(71) Applicant: Western Digital Technologies Inc., San Jose, CA (US)

(72) Inventors: Mehdi Habibollahzadeh, San Jose, CA (US); Sukumar Rajauria, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/742,161

(22) Filed: Jun. 13, 2024

(51) Int. Cl.
  *G11B 7/126* (2012.01)
  *G11B 5/02* (2006.01)
  *G11B 5/60* (2006.01)
  *G11B 5/00* (2006.01)

(52) U.S. Cl.
  CPC ...... *G11B 5/607* (2013.01); *G11B 2005/0021* (2013.01)

(58) Field of Classification Search
  CPC ... G11B 7/126; G11B 5/02; G11B 2005/0021; G11B 13/08; G11B 5/4866; G11B 5/6088; G11B 5/58; G11B 5/3136; G11B 5/6076
  USPC .......................................................... 360/59
  See application file for complete search history.

(56) References Cited

U.S. PATENT DOCUMENTS

| | | | |
|---|---|---|---|
| 8,675,455 B1 | 3/2014 | Krichevsky et al. | |
| 8,897,104 B1 | 11/2014 | Yan et al. | |
| 9,019,646 B2 | 4/2015 | Rausch et al. | |
| 9,281,659 B1 | 3/2016 | Tatah et al. | |
| 9,881,641 B1 | 1/2018 | Canchi et al. | |
| 9,916,851 B1 | 3/2018 | Seigler et al. | |
| 11,587,587 B1 * | 2/2023 | Yasuna | G11B 5/607 |
| 2018/0330754 A1 | 11/2018 | Mendonsa et al. | |
| 2020/0118591 A1 | 4/2020 | Wessel et al. | |

OTHER PUBLICATIONS

Sakoguchi et al., Mode Hopping Impact on NFT Protrusion Measurement in HAMR, IEEE Transactions on Magnetics, vol. 59, Issue 11, Jul. 10, 2023, Retrieved from https://ieeexplore.ieee.org/document/10177246.

* cited by examiner

Primary Examiner — Nabil Z Hindi
(74) Attorney, Agent, or Firm — NOD Law PC

(57) ABSTRACT

Various illustrative aspects are directed to a data storage device comprising one or more disks; one or more heads, including a first head having a first laser diode and a near field transducer; and one or more processing devices configured to: preheat the first LD to a steady state temperature; write a first and a second series of writings at a plurality of thermal fly-height control powers, wherein the first and the second series of writings are written at the steady state temperature, and the first series of writings are of a shorter duration than the second series of writings; determine, for the first head, an NFT protrusion measurement based at least on a difference in TFC power used between (1) one of the first of writings and (2) one of the second series of writings, at a corresponding written signal amplitude.

20 Claims, 13 Drawing Sheets

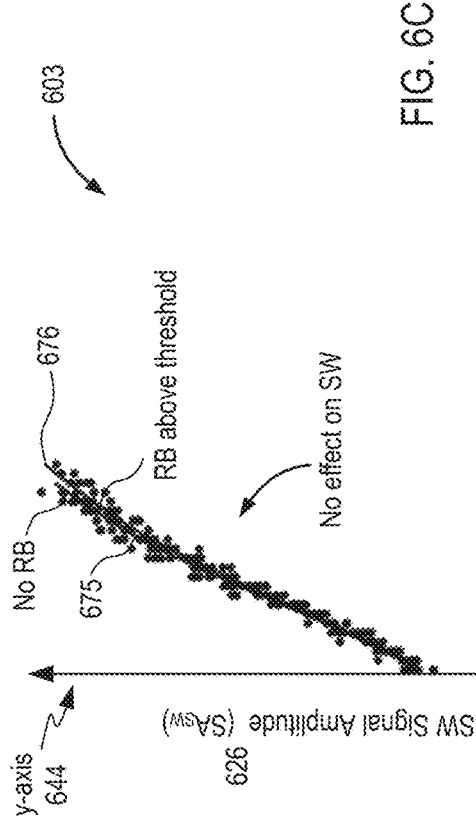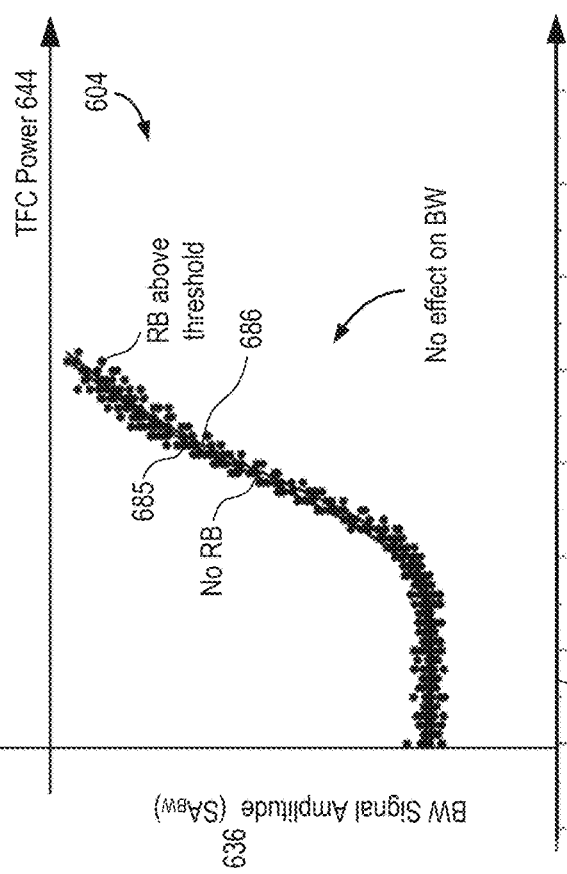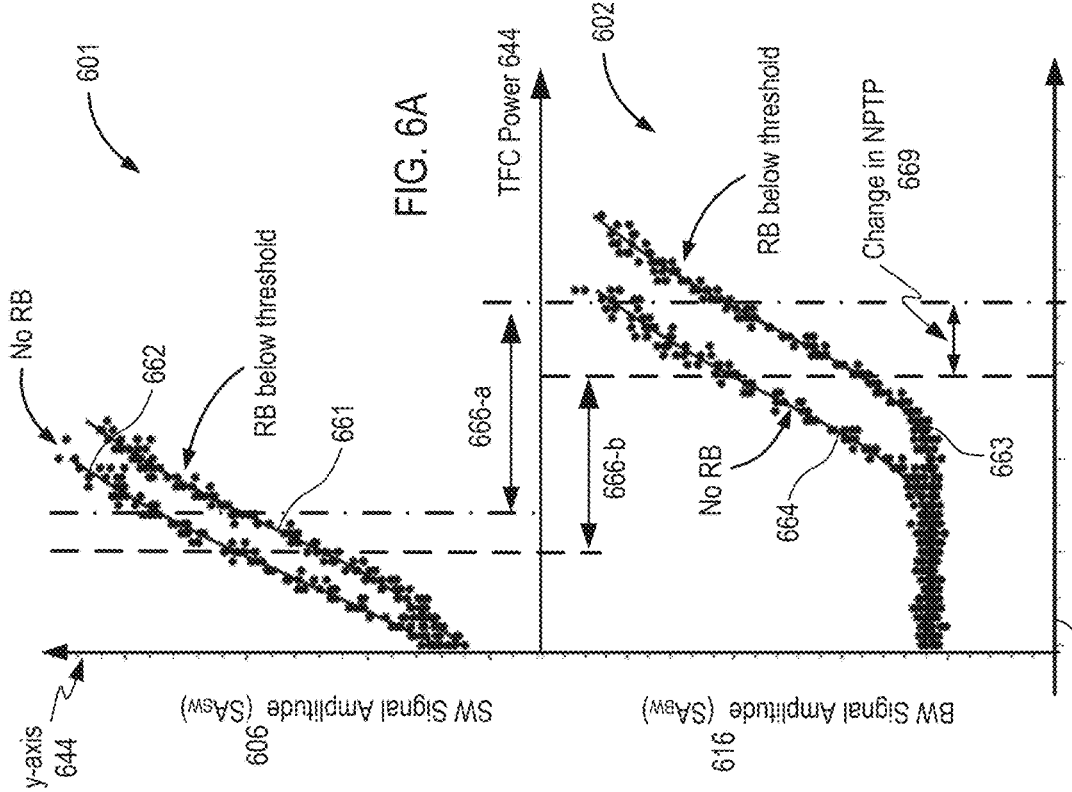

MEASURING NFT PROTRUSION IN A HEAT ASSISTED MAGNETIC RECORDING DRIVE USING BURST WRITING AND A CONSTANT LASER DIODE TEMPERATURE

CROSS REFERENCE TO RELATED APPLICATIONS

This application is related to the disclosures in U.S. patent application Ser. No. 18/447,401, and U.S. patent application Ser. No. 18/402,926. The entirety of these applications are incorporated by reference herein for all proper purposes and to support the claims in this application.

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1A is a conceptual diagram of a prior art disk format 2 comprising a number of radially-spaced, concentric servo tracks 4 defined by servo wedges $6_0$-$6_N$ recorded around the circumference of each servo track. A plurality of concentric data tracks are defined relative to servo tracks 4, wherein the data tracks may have the same or a different radial density (e.g., tracks per inch (TPI)) than servo tracks 6. Each servo wedge $6_i$ comprises a preamble 8 for storing a periodic pattern, which allows proper gain adjustment and timing synchronization of the read signal, and a synchronization mark 10 (sync mark 10) for storing a special pattern used to symbol synchronize to a servo data field 12. Servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head positioning information is processed to position a head over a target data track during a seek operation, and servo bursts 14 provide fine head position information used for centerline tracking while accessing a data track during write/read operations. A position error signal (PES) is generated by reading servo bursts 14, wherein the PES represents a measured position of the head relative to a centerline of a target servo track. A servo controller processes the PES to generate a control signal applied to one or more actuators to actuate the head radially over the disk in a direction that reduces the PES.

The description provided in this background section should not be assumed to be prior art merely because it is mentioned in or associated with this section. The background section may include information that describes one or more aspects of the subject technology.

SUMMARY

The following summary relates to one or more aspects and/or embodiments disclosed herein. It should not be considered an extensive overview relating to all contemplated aspects and/or embodiments, nor should it be regarded to identify key or critical elements relating to all contemplated aspects and/or embodiments or to delineate the scope associated with any particular aspect and/or embodiment. Accordingly, the following summary has the sole purpose of presenting certain concepts relating to one or more aspects and/or embodiments relating to the mechanisms disclosed herein in a simplified form to precede the detailed description presented below.

In some circumstances, it is desirable to accurately control the thermal protrusion of the magnetic read/write head with respect to the disk surface in order to accurately control the fly height. Besides improving disk drive (e.g., a heat assisted magnetic recording or HAMR drive) performance, accurate control of fly height is crucial to prevent "catastrophic" head media contact during operation. One technique for estimating/measuring thermal protrusion (NPTP) of the near field transducer (NFT) in a HAMR drive relies on measurements taken by an NFT temperature sensor (NTS). In some cases, the NTS facilitates detecting a temperature generated by the slider's proximity to the disk or media surface. The temperature detected by the NTS can then be used to estimate the fly-height of the read/write head above the disk surface. While the NTS technique is a feasible means for estimating or measuring the NFT protrusion, it can be cumbersome and/or complex to implement.

Another technique for measuring the NFT protrusion comprises a burst write scheme (BWS), which involves performing a first series of writings and a second series of writings, where the second series of writings are of a longer duration than the first series of writings. In some cases, the first series of writings are referred to as "short writes" or "burst writes (BW)", while the second series of writings are referred to as "long writes" or "sector writes (SW)". Typically, the duration of the burst writes is shorter than the NFT protrusion time constant (i.e., the time taken for NFT protrusion to occur), while the sector writes are of a sufficient duration to cause the NFT protrusion to be in steady-state.

In some circumstances, HAMR BWS can be another feasible technique for measuring NFT protrusion. However, in some cases, currently used techniques for HAMR BWS suffer some deficiencies, a primary one being that they are less accurate than the more complex NTS technique. Furthermore, there is often some discrepancy (e.g., ~1-5 mW) between the NFT protrusion measurements determined using these two techniques. A major contributing factor for this discrepancy lies in the fact that the LD temperature is not in steady-state when the first series of writings (or burst writes) are performed. As known in the art, there is a laser diode temperature transient at or near the start of a write operation in HAMR drives, since the LD takes some time (e.g., at least 4-5 ms, around 1 rev, anywhere between 1-2 revs, etc.) to reach steady state temperature. In some instances, the amount of time taken for the LD to reach steady state temperature may be referred to as the time constant for the laser or laser diode. It should be noted that the time constants (e.g., 4-5 ms, around 1 rev, etc.) described herein are exemplary only and not intended to limit the scope and/or spirit of the present disclosure. It should be noted that other laser or LD time constants are contemplated in different embodiments. Furthermore, there exists a relation between the LD temperature, LD power, and written signal amplitude, where, for the same laser current, a rise in LD temperature causes a drop in both LD power and written signal amplitude. This results in a mismatch in the laser power and/or write signal amplitude used during the burst writes and the sector writes, which leads to the discrepancy and/or reduced accuracy of existing BWS compared to NTS techniques for measuring NFT protrusion.

In accordance with aspects of the present disclosure, a refined BWS technique for measuring NFT protrusion is provided, which can help alleviate one or more of the issues prevalent in existing BWS techniques. Specifically, but without limitation, the BWS discussed herein may be performed at a constant laser diode temperature, and may involve (1) preheating the laser diode to an appropriate temperature (e.g., a steady state temperature) such that the written amplitude will be in steady state, (2) performing the first and second series of writings (i.e., burst writes, sector writes) for a range of TFC powers, and (3) measuring the delta TFC power between the SW and BW for the same written signal amplitude. In some cases, the written signal amplitude may also be referred to as "read signal amplitude" since the delta TFC power between the sector writes and burst writes may be measured based on determining the difference in TFC power between the sector write curve and the burst write curve for the same signal amplitude written to or read from the media or disk surface. As such, in some examples, the terms "written signal amplitude" and "read signal amplitude" may be used interchangeably throughout the disclosure and may refer to an amplitude of a signal determined or measured from reading the signal written to the media or disk surface. In some cases, aspects of the present disclosure can be utilized to generate a relation between read signal amplitude (or written signal amplitude) and TFC power, which allows determining NFT protrusion measurements for each of a plurality of read signal amplitudes (e.g., by determining the difference in TFC power between SW and BW at the same read signal amplitude).

In some aspects, preheating the LD to a target or steady temperature before performing the burst writes and sector writes facilitates in the use of a constant or substantially constant laser power and/or write signal amplitude during the two different NFT protrusion conditions (i.e., BW condition, SW condition), which helps account for the mismatch in NFT protrusion measurements determined using the NTS technique, as described in further detail below. In this way, aspects of the present disclosure can facilitate in enhancing the accuracy of NFT protrusion measurements determined using BWS such that they can not only meet, but also exceed the accuracy of the NFT protrusion measurements determined using other techniques, such as the more complex NTS technique.

In some aspects, the techniques described herein relate to a data storage device configured for heat assisted magnetic recording (HAMR), the data storage device including: one or more disks; one or more heads, including at least, a first head having a first laser diode (LD) and a near field transducer (NFT); and one or more processing devices configured to: preheat the first LD to a steady state temperature; after the preheating, write, using the first head, a first series of writings at a plurality of thermal fly-height control (TFC) powers, and write, using the first head, a second series of writings at the plurality of TFC powers, wherein the first series of writings are of a shorter duration than the second series of writings; and determine, for the first head, an NFT protrusion measurement based at least on a difference in TFC power used between (1) one of the first of writings and (2) one of the second series of writings, at a corresponding written signal amplitude.

In some aspects, the techniques described herein relate to a method of operating a data storage device utilizing heat assisted magnetic recording (HAMR), the method including: preheating a first laser diode (LD) to a steady state temperature, wherein the first LD is associated with a first head of the data storage device, and wherein the first head comprises a near field transducer (NFT); after the preheating, writing, using the first head, a first series of writings at a plurality of thermal fly-height control (TFC) powers, and writing, using the first head, a second series of writings at the plurality of TFC powers, wherein the first series of writings are of a shorter duration than the second series of writings; and determining, for the first head, an NFT protrusion measurement based at least on a difference in TFC power used between (1) one of the first of writings and (2) one of the second series of writings, at a corresponding written signal amplitude.

In some aspects, the techniques described herein relate to one or more processing devices, including: means for preheating a first laser diode (LD) of a data storage device to a steady state temperature, wherein the first LD is associated with a first head of the data storage device, and wherein the data storage device is configured for heat assisted magnetic recording (HAMR); after the preheating, means for writing, using the first head, a first series of writings at a plurality of thermal fly-height control (TFC) powers, and means for writing, using the first head, a second series of writings at the plurality of TFC powers, wherein the first series of writings have a shorter duration than the second series of writings; means for determining, for the first head, an NFT protrusion measurement based at least on a difference in TFC power used between (1) one of the first of writings and (2) one of the second series of writings, at a corresponding written signal amplitude.

In some aspects, the techniques described herein relate to a data storage device configured for heat assisted magnetic recording (HAMR), the data storage device including: one or more disks; one or more heads, including at least, a first head having a first laser diode (LD) and a near field transducer (NFT); and one or more processing devices configured to: preheat the first LD to a steady state temperature; write, using the first head, a first series of writings at a plurality of thermal fly-height control (TFC) powers, wherein the first series of writings are written at the steady state temperature; write, using the first head, a second series of writings at the plurality of TFC powers, wherein the second series are writings are written at the steady state temperature, and wherein the first series of writings are of a shorter duration than the second series of writings; measure, for the first head, one or more NFT protrusion measurements for one or more written signal amplitudes, wherein the measuring includes: calculating a difference in TFC power between the first and the second series of writings at a corresponding one of the one or more written signal amplitudes.

In some aspects, the techniques described herein relate to a data storage device, wherein the first series of writings include burst writings, and the second series of writings include sector writings.

In some aspects, the techniques described herein relate to a data storage device, wherein, the first series of writings are each under 200 nanoseconds (ns) long, and the second series of writings are each at least 100 microseconds (µs) long.

In some aspects, the techniques described herein relate to a data storage device, wherein each writing of the first series of writings is performed for a shorter duration than one or more of a protrusion time constant for the NFT of the first head and a gas bearing surface (GBS) response time, wherein the GBS response time corresponds to a time required for the GBS to reach steady-state fly height.

In some aspects, the techniques described herein relate to a data storage device, wherein preheating the first LD includes preheating the first LD using dark laser heating (DLH).

In some aspects, the techniques described herein relate to a data storage device, wherein preheating the first LD includes applying a reverse bias (RB) to preheat the first LD.

In some aspects, the techniques described herein relate to a data storage device, wherein preheating the first LD to the steady state temperature reduces or minimizes effects of LD temperature transients on the one or more written signal amplitudes corresponding to each of the first and the second series of writings.

In some aspects, the techniques described herein relate to a data storage device, further including one or more additional LDs, including at least a second LD associated with a second head, and wherein the one or more processing devices are further configured to: preheat the second LD to the steady state temperature; write, using the second head, a third series of writings at the plurality of TFC powers, wherein the third series of writings are performed at the steady state temperature; write, using the second head, a fourth series of writings at the plurality of TFC powers, wherein the fourth series are writings are performed at the steady state temperature; measure, for one or more written signal amplitudes, one or more NFT protrusion measurements for the second head, wherein the measuring includes: calculating a difference in TFC power between the third and the fourth series of writings at a corresponding one of the one or more written signal amplitudes.

In some aspects, the techniques described herein relate to a data storage device, wherein: the first series of writings and the third series of writings include burst writings, the second series of writings and the fourth series of writings include sector writings, the first series of writings have a shorter duration than the second series of writings, and the third series of writings have a shorter duration than the fourth series of writings.

In some aspects, the techniques described herein relate to a method of operating a data storage device utilizing heat assisted magnetic recording (HAMR), the method including: preheating a first laser diode (LD) to a steady state temperature, wherein the first LD is associated with a first head of the data storage device; writing, using the first head, a first series of writings at a plurality of thermal fly-height control (TFC) powers, wherein the first series of writings are performed at the steady state temperature; writing, using the first head, a second series of writings at the plurality of TFC powers, wherein the second series are writings are performed at the steady state temperature, and wherein the first series of writings are of a shorter duration than the second series of writings; measuring, for one or more written signal amplitudes, one or more near field transducer (NFT) protrusion measurements for the first head, wherein the measuring includes: calculating a difference in TFC power between the first and the second series of writings at a corresponding one of the one or more written signal amplitudes.

In some aspects, the techniques described herein relate to a method, wherein the first series of writings include burst writings, and where the second series of writings include sector writings.

In some aspects, the techniques described herein relate to a method, wherein, the first series of writings are under 200 ns long, and the second series of writings are at least 100 us long.

In some aspects, the techniques described herein relate to a method, wherein each writing of the first series of writings is performed for a shorter duration than one or more of a protrusion time constant for the NFT of the first head and a gas bearing surface (GBS) response time, wherein the GBS response time corresponds to a time required for a GBS to reach steady-state fly height.

In some aspects, the techniques described herein relate to a method, wherein preheating the first LD includes preheating the first LD using dark laser heating (DLH).

In some aspects, the techniques described herein relate to a method, wherein preheating the first LD includes applying a reverse bias (RB) to preheat the first LD.

In some aspects, the techniques described herein relate to a method, wherein preheating the LD reduces or minimizes effects of LD temperature transients on the one or more written signal amplitudes corresponding to the first series of writings.

In some aspects, the techniques described herein relate to a method, wherein preheating the LD further reduces or minimizes effects of LD temperature transients on the one or more written signal amplitudes corresponding to the second series of writings.

In some aspects, the techniques described herein relate to a method, wherein the data storage device further includes one or more additional LDs, including at least a second LD associated with a second head, the method further including: preheating the second LD to the steady state temperature; writing, using the second head, a third series of writings at the plurality of TFC powers, wherein the third series of writings are performed at the steady state temperature; writing, using the second head, a fourth series of writings at the plurality of TFC powers, wherein the fourth series are writings are performed at the steady state temperature, and wherein the third series of writings are of a shorter duration than the second series of writings; measuring, for the one or more written signal amplitudes, one or more NFT protrusion measurements for the second head, wherein the measuring includes: calculating a difference in TFC power between the third and the fourth series of writings at a corresponding one of the one or more written signal amplitudes.

In some aspects, the techniques described herein relate to a method, wherein: the first series of writings and the third series of writings include burst writings, and the second series of writings and the fourth series of writings include sector writings.

In some aspects, the techniques described herein relate to one or more processing devices, including: means for preheating a first laser diode (LD) of a data storage device to a steady state temperature, wherein the first LD is associated with a first head of the data storage device, and wherein the data storage device is configured for heat assisted magnetic recording (HAMR); means for writing, using the first head, a first series of writings at a plurality of thermal fly-height control (TFC) powers, wherein the first series of writings are associated with the steady state temperature; means for writing, using the first head, a second series of writings at the plurality of TFC powers, wherein the second series are writings are associated with the steady state temperature, and wherein the first series of writings have a shorter duration than the second series of writings; means for measuring, for one or more written signal amplitudes, one or more near field transducer (NFT) protrusion measurements for the first head, wherein the means for measuring includes: means for calculating a difference in TFC power between the first and the second series of writings at a corresponding one of the one or more written signal amplitudes.

Various further aspects are depicted in the accompanying figures and described below and will be further apparent based thereon.

BRIEF DESCRIPTION OF THE DRAWINGS

Various features and advantages of the technology of this disclosure will be apparent from the following description of particular examples of those technologies, and as illustrated in the accompanying drawings. The drawings are not necessarily to scale; emphasis instead is placed on illustrating the principles of the technological concepts. In the drawings, like reference characters may refer to the same parts throughout different views. The drawings depict only illustrative examples of this disclosure and are not limiting in scope.

FIG. 6A is a conceptual graph showing signal amplitude against TFC power for a sector write mode and when no reverse bias is applied as compared to when a reverse bias is applied such that the LD temperature is in steady state, according to various aspects of the present disclosure.

FIG. 6B is a conceptual graph showing signal amplitude against TFC power for a burst write mode and when no reverse bias is applied as compared to when a reverse bias is applied such that the LD temperature is in steady state, according to various aspects of the present disclosure.

FIG. 6C is a conceptual graph showing signal amplitude against TFC power for a sector write mode and when no reverse bias is applied as compared to when a reverse bias is applied but the LD temperature is not in steady state, in accordance with one or more implementations.

FIG. 6D is a conceptual graph showing signal amplitude against TFC power for a burst write mode and when no reverse bias is applied as compared to when a reverse bias is applied but the LD temperature is not in steady state, in accordance with one or more implementations.

DETAILED DESCRIPTION

Figure 1A:
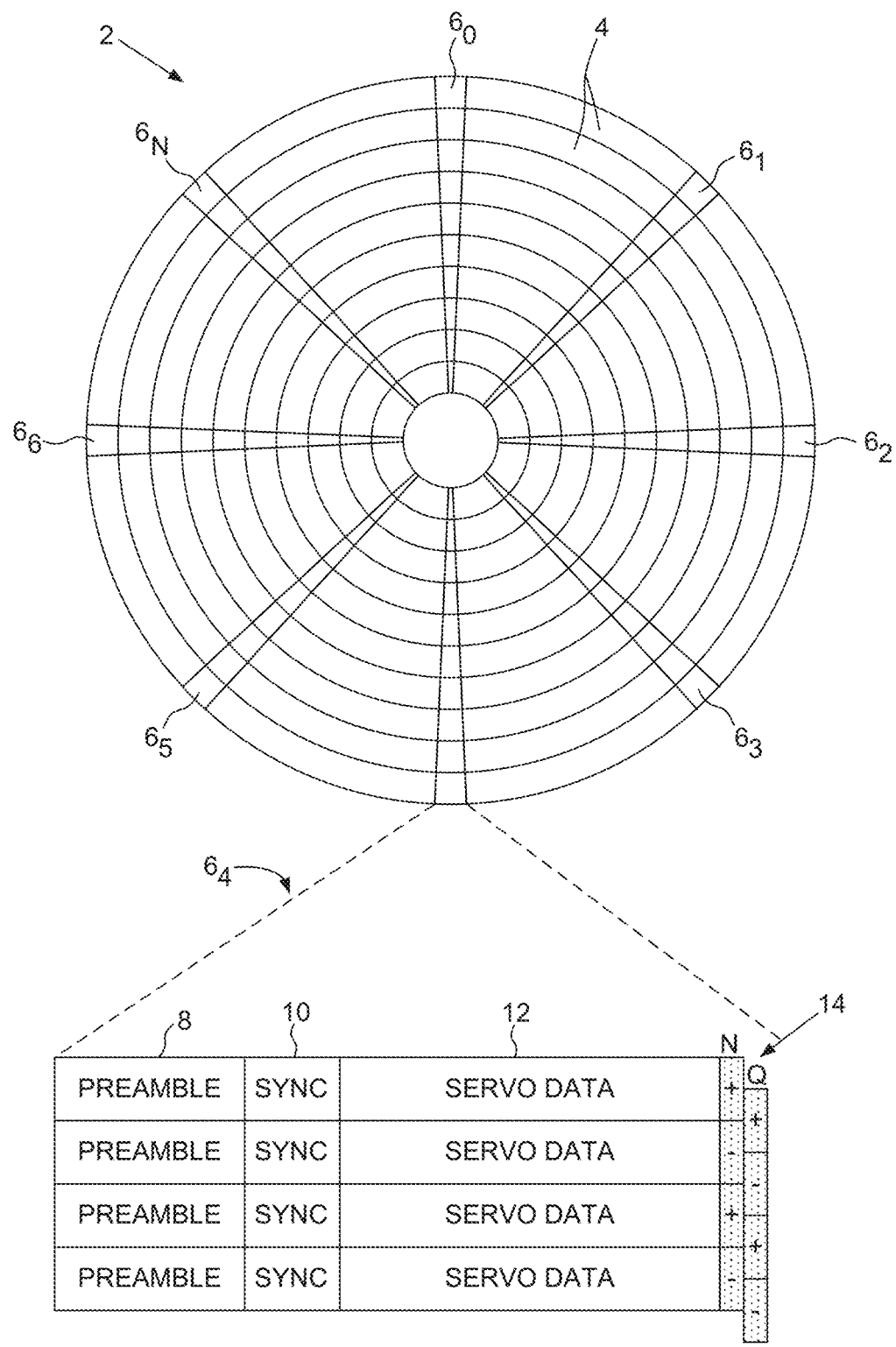
FIG. 1A is a conceptual diagram of a disk format comprising a number of radially-spaced, concentric servo tracks defined by servo wedges recorded around the circumference of each servo track, according to various aspects of this disclosure.

The word "exemplary" is used herein to mean "serving as an example, instance, or illustration." Any embodiment described herein as "exemplary" should not be construed as preferred or advantageous over other embodiments.

The embodiments described below are not intended to limit this disclosure to the precise form disclosed, nor are they intended to be exhaustive. Rather, they are presented to provide a description so that others skilled in the art may utilize their teachings. Technology continues to develop, and elements of the described and disclosed embodiments may be replaced by improved and enhanced items. However, the teachings of this disclosure inherently disclose elements used in embodiments incorporating technology available at the time of this disclosure.

The demand for data storage continues to increase rapidly, driving the need for hard drives that can store more data in the same physical space. However, traditional magnetic recording techniques face a physical limit known as the superparamagnetic limit. This is the point at which magnetic bits become so small that thermal fluctuations can cause them to spontaneously change state, leading to data loss. In other words, the recording of smaller magnetic bits causes the recorded magnetic bits to become ever more magnetically and thermally unstable. One way to make the magnetic bits more stable is to design the magnetic media to have a high magnetic anisotropy. However, this high magnetic anisotropy would also require higher magnetic write field to write to such a media. In some circumstances, producing such a high write field comes with its own set of challenges because of the smaller write pole needed to record such small magnetic bits.

Heat-assisted magnetic recording (HAMR) is a technology developed to address this issue. HAMR overcomes the superparamagnetic limit by using heat to temporarily reduce the coercivity (resistance to changes in magnetization) of the magnetic material on the disk. In a HAMR drive, the magnetic media (e.g., shown as disk 16 in FIG. 1C) is locally, temporarily heated at or near the point of writing. In some examples, this is achieved by using a laser diode (LD) to heat a small area of the disk, enabling data to be written at a higher density to that area. In some cases, this heating helps temporarily lowers the magnetic anisotropy of the magnetic media, making it easier to write to. After writing, the magnetic media cools, which causes the magnetic anisotropy to increase (e.g., return to its original state before heating), making the recorded magnetic bit thermally stable. Said another way, as the heated area cools, its coercivity returns to its original high level, effectively "locking" the data into place. In this way, HAMR allows for much higher data densities than traditional magnetic recording techniques, as it allows data bits to be written much more closely together without the risk of thermal instability.

In some cases, to achieve this heating, a Near Field Transducer (NFT) is located at or near the disk or media facing surface (MFS), adjacent to the magnetic write pole of a read/write head. Furthermore, a laser diode element (e.g., shown as laser diode 128 in FIGS. 1B and/or 1C) can be mounted at a back side surface of a slider (e.g., slider 103 in FIG. 1B) at a location away from the disk facing surface. The laser diode 128 can be powered and controlled by the preamp 104 and/or the LD driver 115 of the arm electronics (AE) 102. Light from the laser diode can be directed to the NFT 134 by a waveguide (e.g., waveguide 131). In one non-limiting example, the NFT 134 can include a plasmonic antenna for focusing heat from the laser light to a very small point on the magnetic media. While not necessary, the plasmonic antenna of the NFT 134 can be formed of a material such as gold (Au), although other types of materials can also be utilized in different embodiments.

In some circumstances, performance of the magnetic read/write head in a disk drive, such as a HAMR drive, can be dependent on one or more parameters or factors. One of the parameters that affects the performance of a magnetic read/write head is the height at which the magnetic read/write head flies over the surface of the magnetic disk/media. This height is referred to as the "fly height" and it directly affects the magnetic spacing between the recording layer of the magnetic media and one or more of the write pole and the read sensor of the read/write head. Generally, a lower fly height and/or smaller magnetic spacing facilitates in enhancing the performance of the magnetic recording system. However, if the fly height is too low, there is a heightened risk of physical contact between the magnetic read/write head and the media surface. This physical contact, which is known as a "crash", can cause catastrophic damage to the magnetic read/write head as well as to the media. In some circumstances, this can cause loss of a portion of or even all of the data recorded to the HDD. In extreme cases, this "touchdown" or "crash" of the read/write head and the media surface can result in complete failure of the magnetic recording system.

Figure 1B:
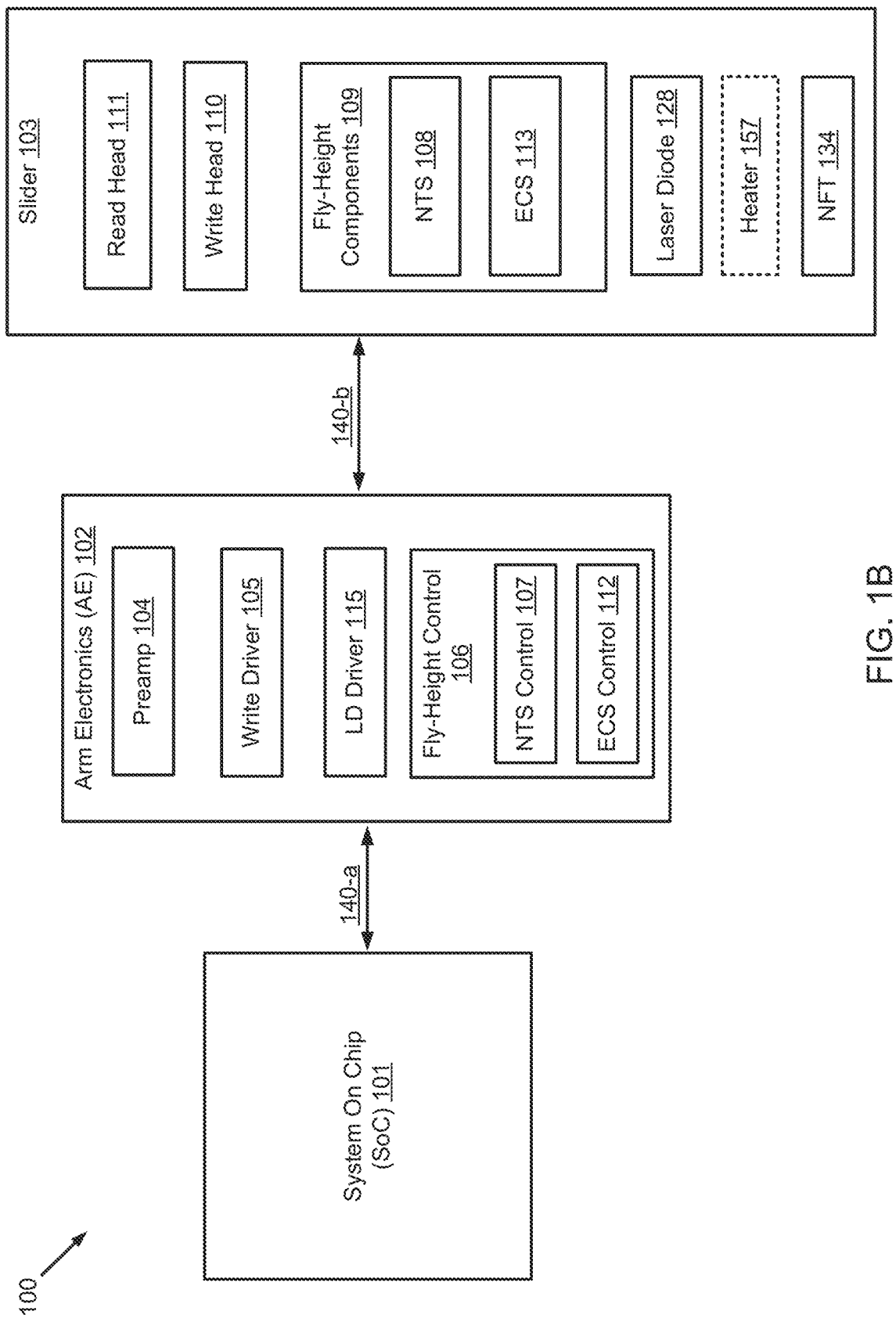
FIG. 1B shows a block diagram illustration of selected components of a disk drive, such as a heat assisted magnetic recording (HAMR) drive, according to various aspects of the present disclosure.

Thus, there is a need to carefully control the fly-height at which the read and write elements of the head(s) fly over the magnetic media. In some circumstances, tribological forces, such as the air bearing surface design of the media facing surface, can only go so far in controlling the fly height during operation. However, thermal fly height control (e.g., adjusting the TFC power) can be used to adjust the fly height of the read and write elements during disk drive operation. To this end, the AE 102 and/or the slider 103 can include a thermal fly-height control system that can be located at or near the media facing surface. For example, as shown in FIG. 1B, the AE 102 includes a fly-height control system 106 and the slider 103 includes fly-height components 109, where the fly-height control system 106 includes one or more of an NFT temperature sensor (NTS) control 107 and an embedded contact sensor (ECS) control 112. Additionally, the fly-height components 109 of the slider 103 include an NTS 108 and an ECS 113. Furthermore, the slider 103 can include an optional heating element, such as heater 157. In some cases, as the optional heating element 157 heats up, it causes thermal expansion in the surrounding structures. This can cause the read sensor and/or the write pole of the head to protrude outward, thereby reducing the effective fly height and magnetic spacing of these elements (i.e., read sensor, write pole) with respect to the disk surface.

Ideally, all of the thermal protrusion of the elements of the read/write head would come only from the heating element and would be controlled solely by the fly height control circuitry 106. However, in reality, other thermal factors come into play. For example, while the NFT 134 is designed specifically to heat only the magnetic media, some heating of surrounding structure(s) and/or the NFT itself may inevitably occur. This heating can vary with the power applied to the laser diode and can also vary between different magnetic recording systems and with different operating conditions. Additionally, or alternatively, the magnetic writing itself can cause some thermal protrusion. For instance, as electrical current flows through the write coil (in order to initiate a necessary magnetic field) in the write head, Joule heating of the write coil may cause thermal expansion of the write coil and surrounding structure, thereby resulting in writer induced thermal protrusion (e.g., shown as IWptp 335 in FIGS. 3A-B).

As discussed above, it is desirable to accurately control the thermal protrusion of the magnetic read/write head in order to accurately control the fly height to maximize performance and prevent unwanted media contact during operation. However, the ancillary effects of the NFT induced thermal protrusion (e.g., NFTptp 336 in FIG. 3A) and writer induced thermal protrusion (e.g., IWptp 335 in FIGS. 3A-B) make it difficult to determine the correct amount of power to be applied to the thermal fly height control (TFC) system. Furthermore, the amount of thermal protrusion from the NFT and the writer can vary between different data recording systems as a result of manufacturing variations and can also vary as a result of environmental factors such as ambient temperature and atmospheric pressure. In some instances, the amount of protrusion from the NFT and/or the writer can vary over time as the data recording system ages.

In some cases, the clearance or spacing between the NFT and the magnetic media may directly affect the amplitude of the recorded signal. In some instances, and depending on the material (e.g., a soft material, such as gold) used to form the NFT, the NFT is especially vulnerable to inadvertently contacting the magnetic media during use. As noted above, such contact between the media and components (e.g., NFT) of the read/write head can render the NFT, and the entire HAMR drive, inoperable. Therefore, there is a need for a non-destructive method and means for accounting for the NFT protrusion and/or writer induced thermal protrusion at various operational conditions in various data recording systems and in a manner that does not result in damage to the data recording system In order to account for Near Field Transducer (NFT) protrusion resulting from heating of the NFT itself, and also protrusion resulting from heating of the write element during use, a burst writing (BW) process can be used to determine a calibration curve that can assist in determining the signal amplitude versus thermal fly height (TFC) control power when operating without the extraneous protrusions from the NFT heating and/or write element heating. In such cases, the actual amount of protrusion during thermal steady state writing can then be determined and a TFC control power can be adjusted to maintain an optimal or target fly height. In some circumstances, burst writing scheme (BWS) may refer to a technique for calculating or estimating the NFT protrusion. In some aspects, BWS is a measure of delta TFC with same written amplitude using two different protrusion modes/conditions, e.g., burst write (BW) condition and sector write (SW) condition.

In some cases, however, there is a mismatch between the NFT protrusion determined using existing HAMR BWS measurements and other techniques, such as, but not limited to, NTS and multiple touchdown (MTD). One of the factors contributing to this discrepancy is that the BWs and SWs are not measured at the same laser diode temperature. Some aspects of the present disclosure are directed to a refined BWS for NFT protrusion measurements using a constant laser diode temperature. Such a design can help address the discrepancies in NFT protrusion measurements determined using BWS and other techniques (e.g., NTS), as well as help identify a NPTP correction factor in the event that BWS was performed under non steady-state conditions. In some embodiments, the laser diode temperature can be preheated to a target or steady state temperature before performing the BWs and SWs, which not only helps avoid laser diode temperature transients, but also helps ensure the written signal amplitude is in steady state. In this way, the disclosed BWS for NFT protrusion measurements can help enhance reliability and performance of HAMR drives by providing a more accurate way for calibrating the physical spacing between the various elements of the read/write head and the disk surface, as compared to the prior art.

A disk drive 100 according to various aspects of the disclosure, as seen in FIG. 1B, comprises a system on a chip (SoC) 101, where the SoC 101 comprises the electronics and firmware for the drive and used to control the functions of the drive including providing power and/or control signals to the components shown in arm electronics (AE) 102. Each disk (shown as disk 16 in FIG. 1C, disks 16A-D in FIG. 2B) can have thin film magnetic material on each of the planar surfaces. Each recording surface may comprise a dedicated pair of read and write heads packaged in a slider 103 that is mechanically positioned over the rotating disk by an actuator (e.g., shown as actuator assembly 19 in FIG. 2B). In some examples, the actuator(s) also provide the electrical connections to the slider 103 components. The actuator assembly 19 may also comprise the AE 102, the AE 102 comprising preamplifiers or preamps 104 (e.g., read and/or write preamp) for the heads (e.g., read head 111, write head 110), write driver 105, laser diode (LD) driver 156, and fly-height controls 106. In some examples, the fly-height control circuit 106 includes a near field transducer (NFT) temperature sensor (NTS) control circuit 107, for example, when the disk drive employs heat assisted magnetic recording (HAMR). The fly-height control circuit 106 may further include an embedded contact sensor (ECS) control circuit 112. In this example, the slider 103 can include fly-height components 109, where the fly-height components 109 include an NTS 108 and an ECS 113 in the slider 103. In other words, the HAMR drive 100 can include NTS 108 and ECS 113 in the slider 103 along the associated NTS control circuitry 107 and the ECS control circuitry 112, respectively, in the AE 102. It is noted that some of the components shown in AE 102 can be implemented or partially implemented in SoC 101, according to various aspects of the disclosure. While AE 102 is shown as including preamps 104, AE inclusive of some or all of the functional blocks above other than preamps 104 may be implemented together in a preamp IC, and AE may be referred to as preamp IC 102 below.

As seen, a first connection (e.g., flex cable) 140-a connects the SoC 101 to the AE 102, while a second connection (e.g., flex cable) 140-b connects the AE 102 to the slider 103. The AE 102 typically include digital and analog circuitry that control the signals sent to the components in the slider 103 and process the signals received from the components of the slider 103. The AE 102 can include registers that are set using serial data from the SoC 101 to provide parameters for the AE functions. The write driver 105 generates an analog signal that is applied to an inductive coil (or write coil) in the write head 110 to write data by selectively magnetizing portions of the magnetic material on the surface of the rotating disk(s) 16. It is noted that while AE is so named as the electronic components are generally placed at the arm actuators in various embodiments, the actual physical location may vary in other embodiments.

As a disk rotates under a slider of a hard disk drive (HDD), the slider 103 is said to "fly" above the disk. In some cases, a thermal fly-height control (TFC) device (e.g., heater element, such as, optional heater 157 in FIGS. 1B-C) can be disposed within the slider 103 to contort the slider near the read and write transducers (or elements), and thereby vary the fly-height for the read and write transducers. In some examples, read and write elements or transducers reside in the slider 103 of the disk drive 100. In some cases, the disk drive 100 comprises fly-height control circuitry 106 that interfaces with fly-height components 109 in the slider 103. TFC is one example of a control technique that uses a heater 157 disposed in the slider 103. The fly-height can be adjusted by heating the slider 103 with the heater 157. Electrical current supplied to the heater 157 by fly-height control circuitry 106 generates heat to thermally expand the slider 103 and modulate the fly-height. As seen, the slider 103 also includes fly-height components 109 and the NTS 108. In some embodiments, the heater 157 can be implemented in the fly-height components 109.

In some cases, the disk drive 100 may utilize TFC of the read/write heads. One type of TFC uses an electrically resistive heater (e.g., heater 157) located on the slider 103 near the head (e.g., read head 111, write head 110). When current is applied to the heater 157, the heater expands and causes the head to expand and thus move closer to the disk surface (e.g., surface of disk 16 in FIG. 1C). The head can be adjusted to different heights, depending on whether the drive is reading or writing. In some examples, the TFC heater, such as heater 157, may be accurately calibrated so that the head-disk spacing can be controlled, where calibration may entail urging the head toward the disk until contact is made ("touchdown") at which point the slider is urged away from the disk ("pull-back"). In some cases, the ECS 113 embedded in the slider 103 near the write head 110 and/or read head 111, can be used to sense touchdown. The ECS 113 may include a metallic strip located at the slider air bearing surface (ABS) or gas bearing surface (GBS). The resistance of the ECS 113 may change in response to temperature changes (e.g., when the slider 103 temperature changes as it comes in close proximity to the disk). In some cases, touchdown can be determined by monitoring the voltage ($V_{ECS}$) across the ECS 113.

Thus, the slider 103 includes write head 110 configured to write data to a disk (e.g., disk 16), a read head 111 configured to read data from the disk, fly-height components 109 configured to adjust slider fly-height (as described above) and a plurality of resistive temperature detectors (RTDs) for sensing the temperature near the ABS or GBS. In some cases, the plurality of RTDs may include at least a first RTD (e.g., NTS 108) and a second RTD (e.g., ECS 113). It is noted that ABS is generally used to describe the surface of the slider 103 facing the disk 16, where the disk drive could be filled with gases other than air (e.g., gases containing helium, nitrogen, to name two non-limiting examples) and that the use of the "ABS" term to describe various aspects of the disclosure is not intended to limit the disclosure to air filled drives. Accordingly, the term "gas bearing surface" or "GBS" can be used instead.

In some cases, the NTS 108 and/or ECS 113 is located proximate to the ABS and write head 110 (or alternatively the read head 111). The NTS 108 and/or ECS 113 facilitates detecting a temperature generated by the slider's proximity to the disk or media. In various embodiments, the NTS 108 and/or ECS 113 may comprise a thermal strip (e.g., metallic or semiconductor strip) on the slider 103. In some cases, the relative temperature at the ABS may be used to estimate the resistance, $R_{RTD}$, of the RTD, such as the ECS 113 or the NTS 108. Typically, the resistance of a material can be represented as a function of its intrinsic resistance and its dimensions (e.g., length, width, thickness or height).

In some cases, HAMR drives, such as disk drive 100, may utilize a laser source and optical waveguide with a NFT 134, where the NFT 134 may be located at the GBS (or ABS). Furthermore, the NTS 108 may be located near the NFT 134 for monitoring its temperature. In some cases, the NFT 134 employs "near field optics," and is optically coupled to the waveguide (e.g., waveguide 131 in FIG. 1C) of the HAMR drive, described in further detail below.

As noted above, in some cases, a HAMR recording head (e.g., write head 110) may include optical components that direct light from a laser (or laser diode) to the disk. During recording, a write element applies a magnetic field to a heated portion of the storage medium or disk 16, where the heat lowers the magnetic coercivity of the media, allowing the applied field to change the magnetic orientation of the heated portion. The magnetic orientation of the heated portion determines whether a one ('1') or a zero ('0') is recorded. Thus, by varying the magnetic field applied to the magnetic recording medium while it is moving, data can be encoded onto the medium.

Figure 1C:
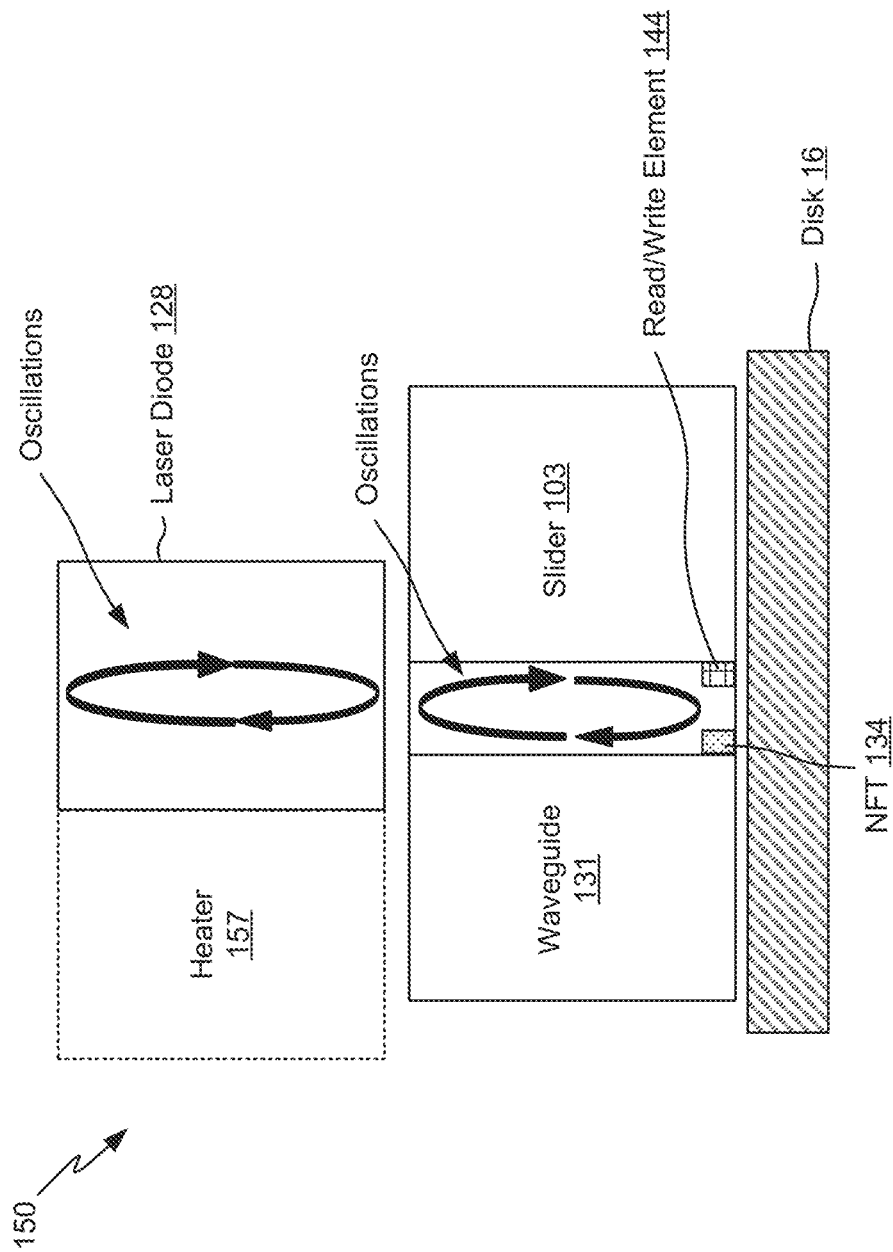
FIG. 1C illustrates a block diagram showing a waveguide, a laser diode (LD), a disk, and a slider of a data storage device, such as a HAMR drive, according to various aspects of the present disclosure.

Turning now to FIG. 1C, which shows an example of a HAMR drive 150 employing a laser diode (LD) 128 and a heater 157, according to various aspects of the present disclosure. In some cases, the heater 157 may be optional (shown as optional by the dotted lines). In some examples, the LD 128 is utilized to heat the media to aid in the recording process. In this example, the LD 128 is disposed within an LD cavity and is proximate to a HAMR read/write element 144, where the read/write element 144 has one end on the ABS of the slider 103. The ABS faces and is held proximate to a moving media surface (e.g., surface of disk 16) during operation of the HDD.

The LD 128 provides optical-based energy to heat the media surface, e.g., at a point near the read/write element 144. In some cases, optical path components, such as a waveguide 131, are formed integrally within the slider 103 to deliver light from the LD 128 to the NFT 134 which provides targeted heat to the media/disk 16. For example, as shown in FIG. 1C, a waveguide 131 and NFT 134 are located proximate to the read/write element 144 to provide local heating of the media or disk 16 during write operations. In some circumstances, various components (e.g., read/write element 144, NFT 134, LD 128, etc.) may experience significant heating due to light absorption and inefficiencies in electrical-to-optical energy conversion as energy produced by the LD 128 is delivered to the magnetic recording medium or disk 16.

In some circumstances, it is desirable to accurately control the thermal protrusion of the magnetic read/write head in order to accurately control the fly height, which serves to optimize HAMR drive performance and prevent "catastrophic" head media contact during operation. One technique for estimating/measuring thermal protrusion (NPTP) of the NFT relies on measurements taken by the NFT temperature sensor (NTS). For example, the NTS 108 in FIG. 1B can facilitate detecting a temperature generated by the slider's proximity to the disk or media. The temperature detected by the NTS can then be used to estimate the fly-height of the read/write head above the disk surface. While the NTS technique is a feasible means for estimating or measuring the NFT protrusion, it can be cumbersome and/or complex to implement.

Another technique for measuring the NFT protrusion comprise a burst write scheme (BWS), which involves performing a first series of writings and a second series of writings, where the second series of writings are of a longer duration than the first series of writings. In some cases, the first series of writings are referred to as "short writes" or "burst writes (BW)", while the second series of writings are referred to as "long writes" or "sector writes (SW)". Typically, the duration of a burst write may be shorter than the NFT protrusion time constant (i.e., the time taken for NFT protrusion to occur). In one non-limiting example, the BWs may be less than 200 ns in duration, however other durations (e.g., <400 ns, <100 ns, anywhere between 50-200 ns, etc.) are contemplated in different embodiments. In contrast, a sector write may be of a sufficient duration to cause the NFT protrusion to reach steady-state. In one non-limiting example, the SWs may be at least 100 us in duration, however other durations (e.g., >200 µs, at least 50 µs, anywhere between 100-400 µs, etc.) are contemplated in different embodiments.

In some cases, HAMR BWS can be another feasible technique for estimating/calculating the NFT protrusion. However, in some circumstances, NFT protrusion measurements determined using existing HAMR BWS techniques may be less accurate than NFT protrusion measurements obtained using the more complex NTS technique. Furthermore, there is often some discrepancy (e.g., ~1-5 mW) between the delta TFC power calculated using the NTS technique and the BWS technique. As noted above, one possible cause of this discrepancy may be due to the LD temperature not being in steady-state when the first series of writings (or burst writes) are performed. As known in the art, there is a laser diode temperature transient at or near the start of a write operation in HAMR drives, since the LD takes some time (e.g., at least 4-5 ms, around 1 rev, anywhere between 1-2 revs, etc.) to reach steady state temperature. Furthermore, there exists a relation between the LD temperature, LD power, and written signal amplitude, where, for the same laser current, a rise in LD temperature causes a drop in both LD power and written signal amplitude. Consequently, the laser power used during the burst writes may not match the laser power used during the sector writes, which can result in the discrepancy and/or reduced accuracy of existing BWS compared to NTS techniques for measuring NFT protrusion.

In accordance with aspects of the present disclosure, the BWS technique for calculating/estimating the NFT protrusion may be performed at a constant (or substantially constant) laser diode temperature, and may involve (1) preheating the laser diode to an appropriate temperature (e.g., a steady state temperature) such that the written amplitude will be in steady state, (2) performing the first and second series of writings (i.e., burst writes, sector writes) for a range of TFC powers, and (3) measuring the delta TFC between the SW and BW for the same written signal amplitude (or read signal amplitude). Specifically, but without limitation, preheating the LD to a target or steady temperature before performing the burst writes and sector writes facilitates in the use of a constant or substantially constant laser power and/or written signal amplitude during the two different NFT protrusion conditions (i.e., BW condition, SW condition), which helps account for the mismatch in NFT protrusion measurements determined using different techniques (e.g., BWS and NTS), as described in further detail below. In this way, aspects of the present disclosure can facilitate in enhancing the accuracy of NFT protrusion measurements determined using BWS such that they can not only meet, but also exceed the accuracy of the NFT protrusion measurements determined using other techniques, such as the more complex NTS technique.

As noted above, in some cases, the written signal amplitude may also be referred to as "read signal amplitude". Specifically, but without limitation, the delta TFC power between the sector writes and burst writes may be calculated based on (1) determining the TFC power for each of the BW and the SW at the same signal amplitude written to (or read from) the media or disk surface, and (2) calculating the difference in the two TFC powers. In some examples, this delta TFC power between the BW curve and SW curve for the same signal amplitude is then used to calculate the NFT protrusion measurement, as described below in reference to FIG. 4. As such, in some examples, the terms "written signal amplitude" and "read signal amplitude" may be used interchangeably throughout the disclosure and may refer to an amplitude of a signal determined or measured from reading the signal written to the media or disk surface.

Figure 2A:
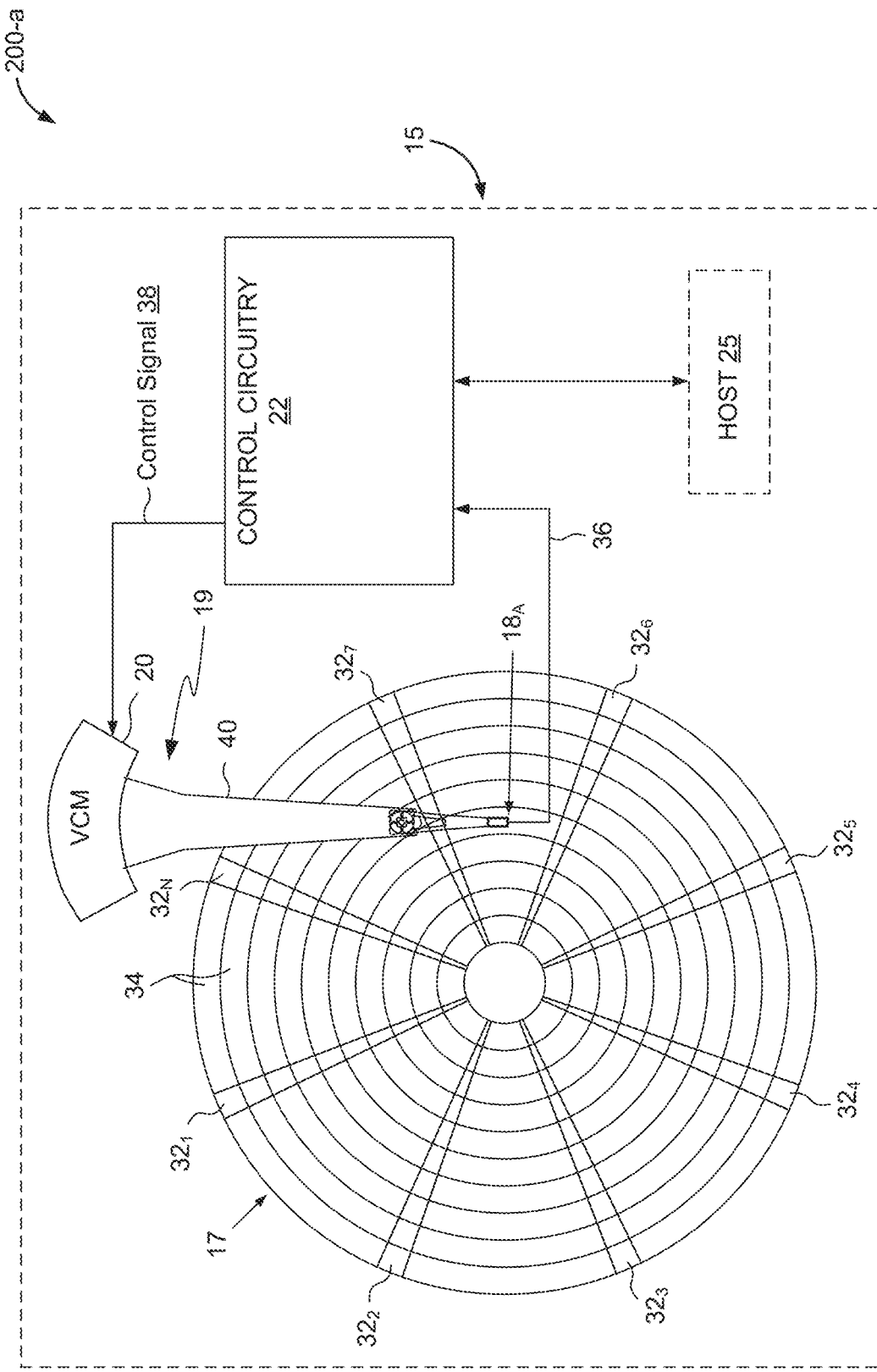
FIG. 2A is a conceptual block diagram of a top view of a data storage device in the form of a disk drive, according to various aspects of this disclosure.
Figure 2B:
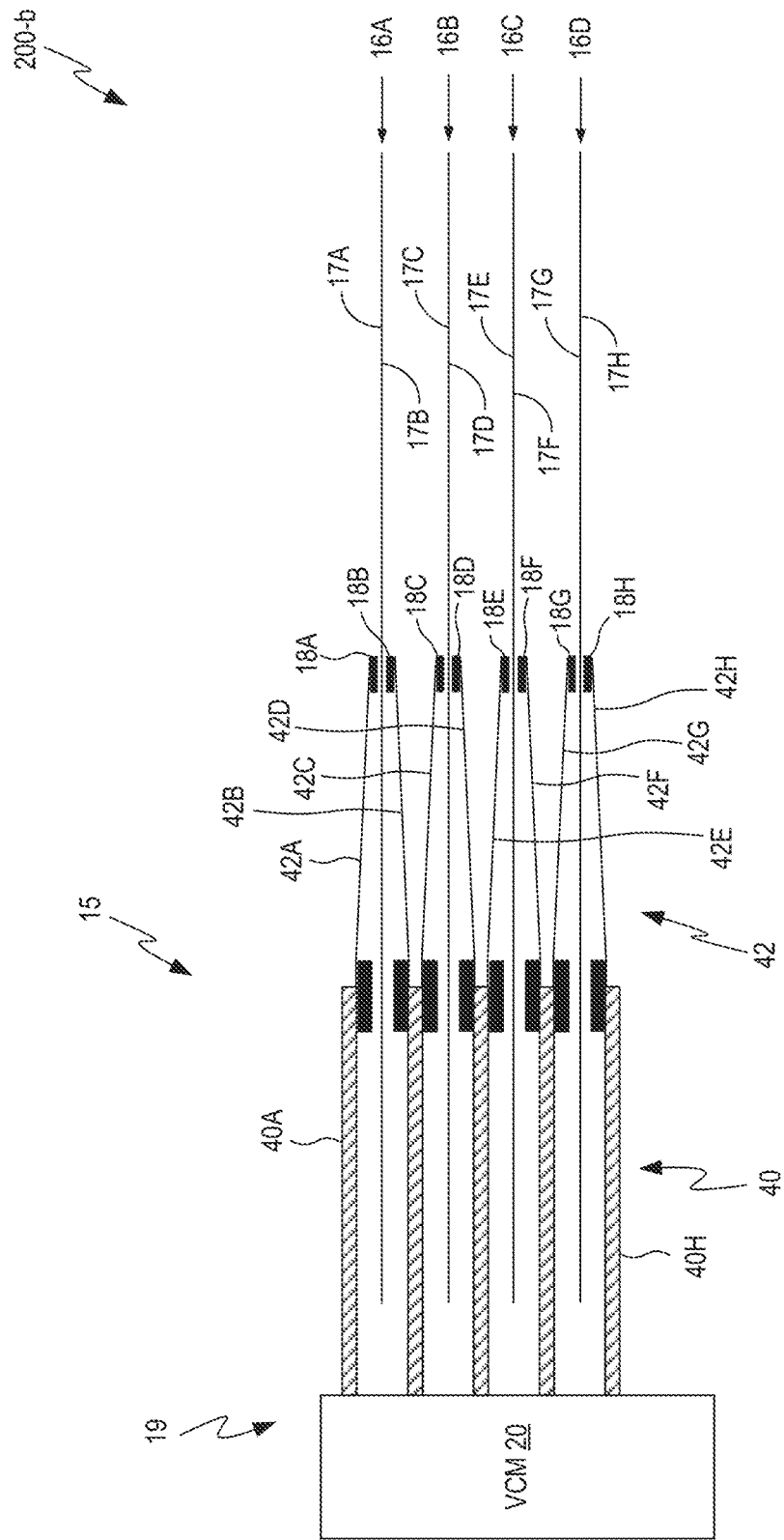
FIG. 2B is a conceptual block diagram of a side view of the data storage device in FIG. 2A, according to various aspects of this disclosure.
Figure 2C:
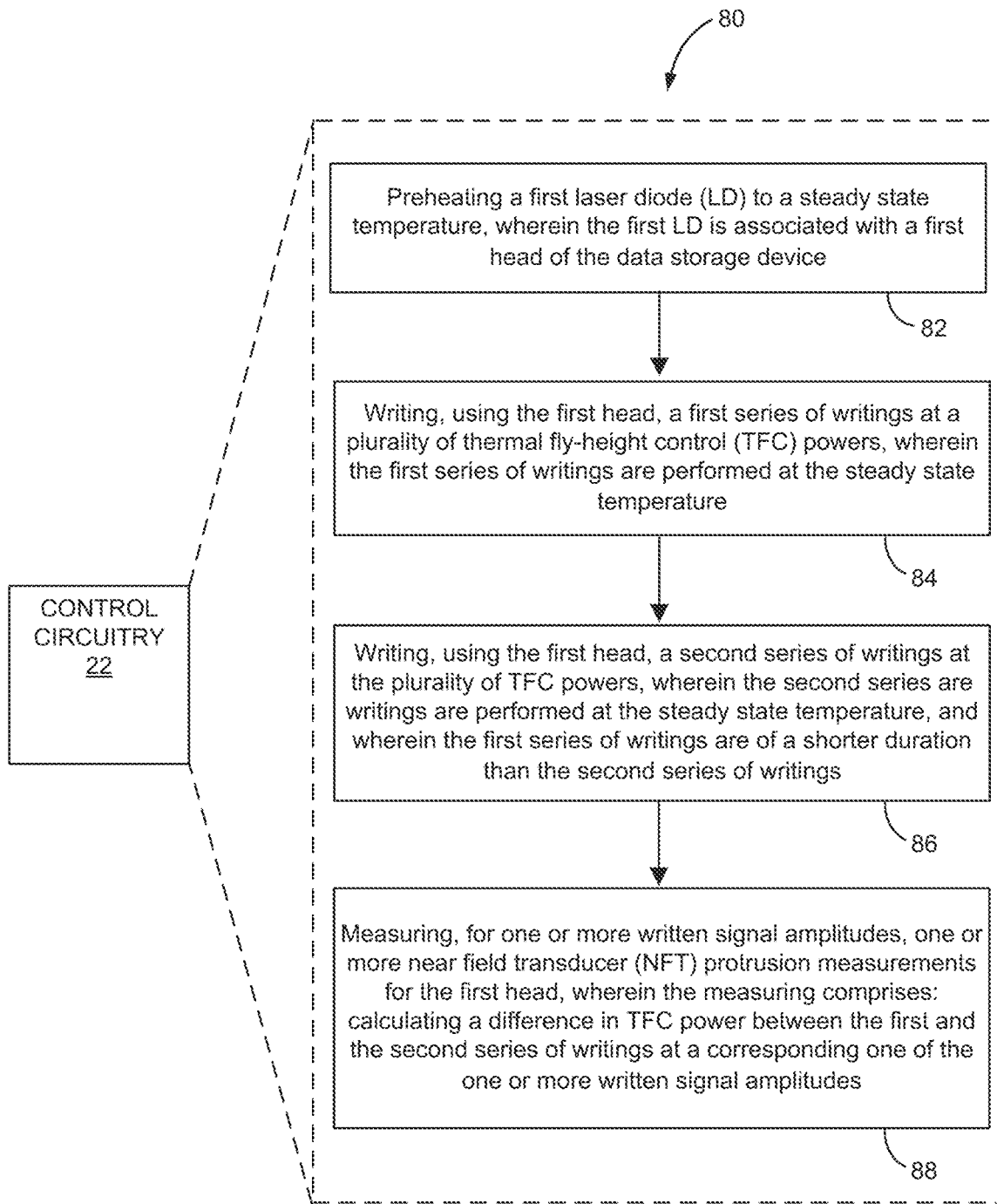
FIG. 2C is a flow diagram of a method that a data storage device may perform, execute, and implement, according to various aspects of this disclosure.

FIGS. 2A and 2B are conceptual top and side views 200-a and 200-b, respectively, of a data storage device in the form of disk drive 15, in accordance with various aspects of this disclosure. Disk drive 15 implements one or more aspects of the disk drives 100 and/or 150 described above in relation to FIGS. 1B and/or 1C, respectively. As seen in FIGS. 2A-2C, the disk drive 15 comprises control circuitry 22, actuator assembly 19, and a plurality of hard disks 16 (i.e., disks 16A, 16B, 16C, 16D).

Actuator assembly 19 is configured to position one or more heads 18 over disk surfaces 17 of one or more disks 16. Head(s) 18 comprise write and read elements, configured for writing and reading control features and/or data to and from a corresponding disk surface 17 (e.g., disk surfaces 17A, 17B, 17C, 17D, 17E, 17F, 17G, 17H) of disk(s) 16. In some cases, head(s) 18 may be similar or substantially similar to the read head 111 and/or write head 110 described in relation to FIG. 1B. As seen in the side view 200-b shown in FIG. 2B, actuator assembly 19 comprises primary actuator 20 (e.g., a voice coil motor ("VCM")) and a number of actuator arms 40 (e.g., topmost actuator arm 40A, lowest actuator arm 40H). Each actuator arm 40 comprises a head 18 at a distal end thereof (e.g., head 18A at a distal end of topmost actuator arm 40A in FIGS. 2A-2B). Each actuator arm 40 is configured to suspend a respective head 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). In the example shown in FIG. 2B, a suspension assembly 42 (e.g., suspension assembly 42A, suspension assembly 42B, suspension assembly 42C, suspension assembly 42D, suspension assembly 42E, suspension assembly 42F, suspension assembly 42G, suspension assembly 42H) is positioned at a distal end of a respective actuator arm 40, and a head 18 (e.g., head 18A, head 18B, head 18C, head 18D, head 18E, head 18F, head 18G, head 18H) is positioned at a distal end of a respective suspension assembly 42. Various examples may include a wide variety of other numbers of hard disks and disk surfaces, other numbers of actuator arm assemblies and primary actuators, other numbers of suspension assemblies, and/or other numbers of fine actuators on each actuator arm than those illustrated in FIGS. 2A-2B.

FIG. 2A also depicts servo sectors 32 (e.g., servo sectors 32I through 32N) written onto disk surfaces 17 (e.g., disk surfaces 17A, 17B, 17C, 17D, 17E, 17F, 17G, 17H). Servo sectors 32 may be written to disk surfaces 17 to define a plurality of evenly-spaced, concentric tracks 34. Each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align a head 18 with and relative to a particular track 34. Each track 34 includes a plurality of embedded servo sectors 32 utilized in seeking and track following. Servo sectors 32 are spaced sequentially around the circumferences of circumferential tracks 34 and extend radially outward from the inner diameter (ID) of disk surface 17. Servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

Control circuitry 22 may also process a signal 36 emanating from a head 18 to demodulate servo data written on the disk (e.g., servo sectors 32) to generate a position error signal (PES) representing an error between the actual position of the head and a target position relative to a target track. Control circuitry 22 may process the PES using a suitable servo control system to generate control signal 38 (e.g., a VCM control signal) applied to VCM 20 which rotates actuator arm 40 about a pivot in order to actuate head 18 radially over disk surface 17 in a direction that reduces the PES. In some embodiments, disk drive 15 may also comprise a suitable micro actuator, such as a suitable piezoelectric (PZT) element for actuating head 18 relative to a suspension (e.g., suspension assembly 42 in FIG. 2B), or for actuating a suspension relative to actuator arm 40.

In some embodiments, host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

Each read/write head 18 is conventionally embedded in the trailing edge of a component known as a slider (e.g., slider 103 in FIGS. 1B and/or 1C). The slider in turn is affixed to a suspension (e.g., suspension assembly 42), which is found at the terminating end of actuator arm 40. As disk 16 spins at a high speed, the slider is lifted, or 'flies', above disk 16. It hovers on a thin layer of air (or gas), maintaining a stable distance measured in nanometers from disk surface 17. This minuscule distance permits read/write heads 18 to retrieve or store data while avoiding direct physical contact with disk surface 17, thereby preventing data corruption and potential damage to disk surface 17.

FIG. 2C is a flow diagram of a method 80 that control circuitry 22 of disk drive 15 may perform or execute in controlling the operations of disk drive 15, including the operations of HAMR components on heads 18 (e.g., heads 18A, 18B, 18C, 18D, 18E, 18F, 18G, and/or 18H) disposed on actuator assembly 19, as further described below. In particular, method 80 can help in NFT protrusion measurements using HAMR BWS, as will be described in detail below.

As seen, a first operation 82 of the method 80 may comprise preheating a first laser diode (LD) to a steady state temperature, wherein the first LD is associated with a first head of the data storage device. A second operation 84 may comprise writing, using the first head, a first series of writings at a plurality of thermal fly-height control (TFC) powers, wherein the first series of writings are performed at the steady state temperature. In some cases, a third operation 86 of the method 80 may include writing, using the first head, a second series of writings at the plurality of TFC powers, wherein the second series are writings are performed at the steady state temperature, and wherein the first series of writings are of a shorter duration than the second series of writings. Next, a fourth operation 88 may comprise measuring, for one or more written signal amplitudes, one or more NFT protrusion measurements for the first head, wherein the measuring comprises: calculating a difference in TFC power between the first and the second series of writings at a corresponding one of the one or more written signal amplitudes.

Figure 2D:
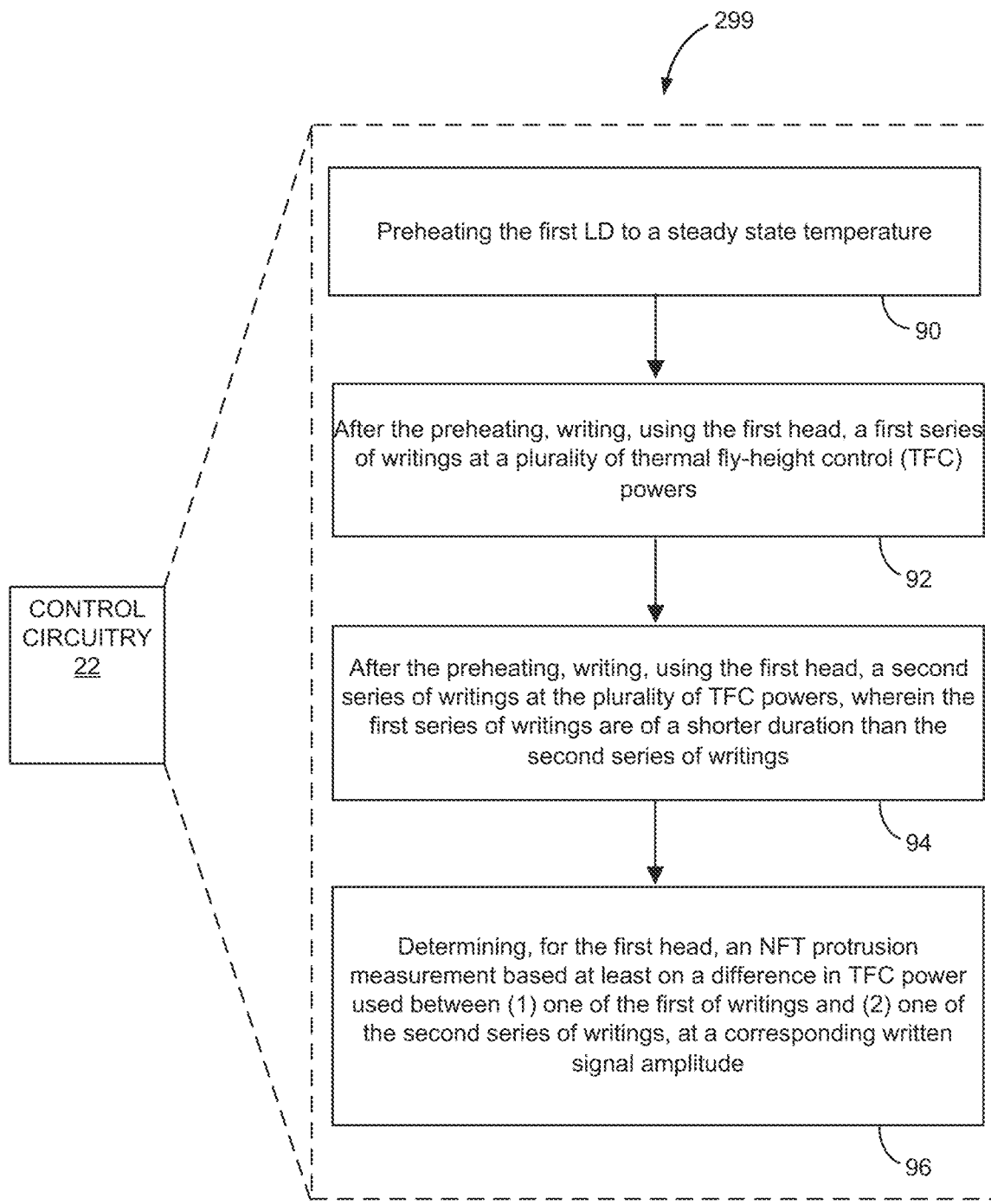
FIG. 2D is a flow diagram of a method that a data storage device may perform, execute, and implement, according to various aspects of this disclosure.

FIG. 2D is a flow diagram of a method 299 that control circuitry 22 of disk drive 15 may perform or execute in controlling the operations of disk drive 15, including the operations of HAMR components on heads 18 (e.g., heads 18A, 18B, 18C, 18D, 18E, 18F, 18G, and/or 18H) disposed on actuator assembly 19, as further described below. In particular, method 80 can help in NFT protrusion measurements using HAMR BWS, as will be described in detail below.

As seen, a first operation 90 of the method 299 may comprise preheating a first laser diode (LD) to a steady state temperature. In some cases, the first LD is associated with a first head of the data storage device. A second operation 92 may comprise after the preheating, writing, using the first head, a first series of writings at a plurality of thermal fly-height control (TFC) powers. In some cases, a third operation 94 of the method 299 may include after the preheating, writing, using the first head, a second series of writings at the plurality of TFC powers, wherein the first series of writings are of a shorter duration than the second series of writings. In some embodiments, second operation 92 may be performed before the third operation 94, although in other cases, third operation 94 may be performed before the second operation 92. Next, a fourth operation 96 may comprise determining, for the first head, an NFT protrusion measurement based at least on a difference in TFC power used between (1) one of the first of writings and (2) one of the second series of writings, at a corresponding written signal amplitude.

Figure 3A:
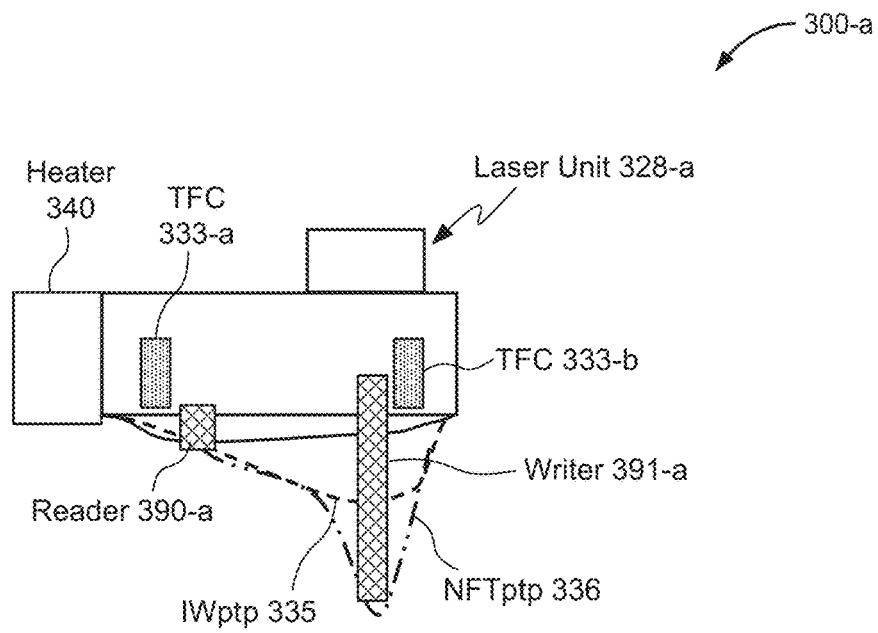
FIG. 3A is a conceptual diagram showing the spacing between various components of a read/write head of a HAMR drive during a first protrusion mode, such as a burst write (BW) mode, according to various aspects of the disclosure.

Turning now to FIG. 3A, which illustrates a conceptual diagram 300-*a* showing the spacing or relative protrusions (not necessarily to scale) of various components of a read/write head of a HAMR drive during a first NFT protrusion mode, such as a sector write mode, according to various aspects of the disclosure. As seen, the read/write head includes a laser unit 328-*a*, a heater 340 (maybe optional in some embodiments), a first TFC element 333-*a*, a second TFC element 333-*b*, a reader element 390-*a*, and a writer element 391-*a*. In some examples, one of the TFC elements (e.g., TFC element 333-*a*) may be optional. In yet other cases, the read/write head of the HAMR drive may comprise more than two TFC elements.

As noted above, during the sector write or SW mode, the writings are of a sufficient duration to cause the NFT protrusion to be in steady state. Here, the Joule heating of the inductive coil (or writer coil) of the writer 391-*a* by the write current (Iw) may induce a write pole tip protrusion, shown as IWptp 335. Additionally, the NFT protrusion during writing (i.e., sector writes) is shown as NFTptp 336.

Figure 3B:
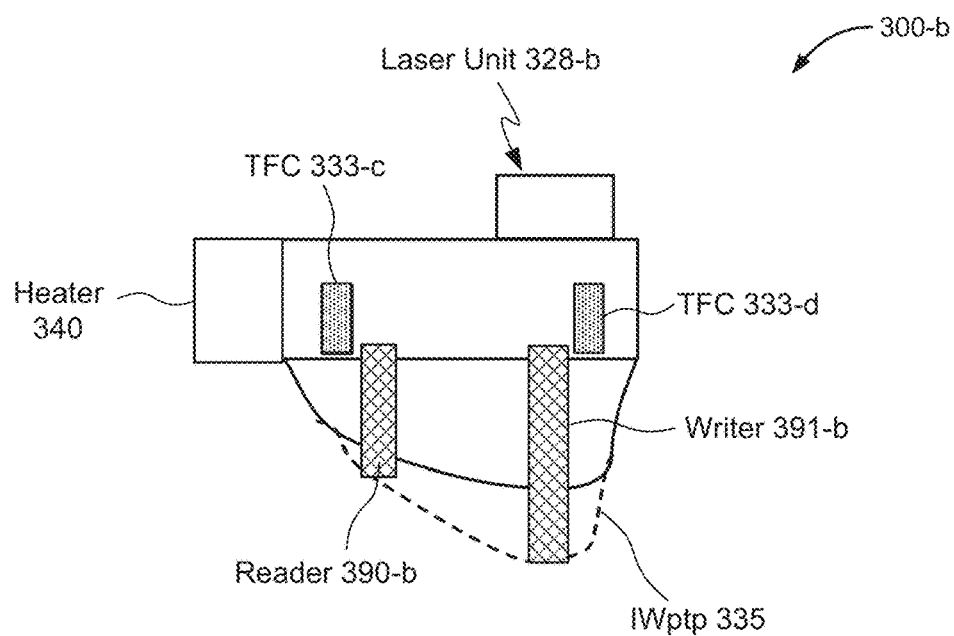
FIG. 3B is a conceptual diagram showing the spacing between various components of a read/write head of a HAMR drive during a second protrusion mode, such as a sector write (SW) mode, according to various aspects of the disclosure

FIG. 3B is a conceptual diagram 300-*b* showing the spacing or relative protrusions (not to scale) between various components of a read/write head of a HAMR drive during a second NFT protrusion mode, such as a burst write mode, according to various aspects of the disclosure. As seen, the read/write head includes a laser unit 328-*b*, the heater 340, TFC elements 333-*c* and 333-*d*, a reader element 390-*b*, and a writer element 391-*b*. Here, and in contrast to FIG. 3A, there is no NFT protrusion since the burst writes are of a shorter duration than the NFT protrusion time constant. In other words, the duration of the burst writes may be short enough to prevent the NFT protrusion (e.g., shown as NFTptp 336 in FIG. 3A) from occurring. Similar to FIG. 3A, however, the Joule heating of the writer coil by the write current (Iw) may induce a write pole tip protrusion, shown as IWptp 335.

Figure 4:
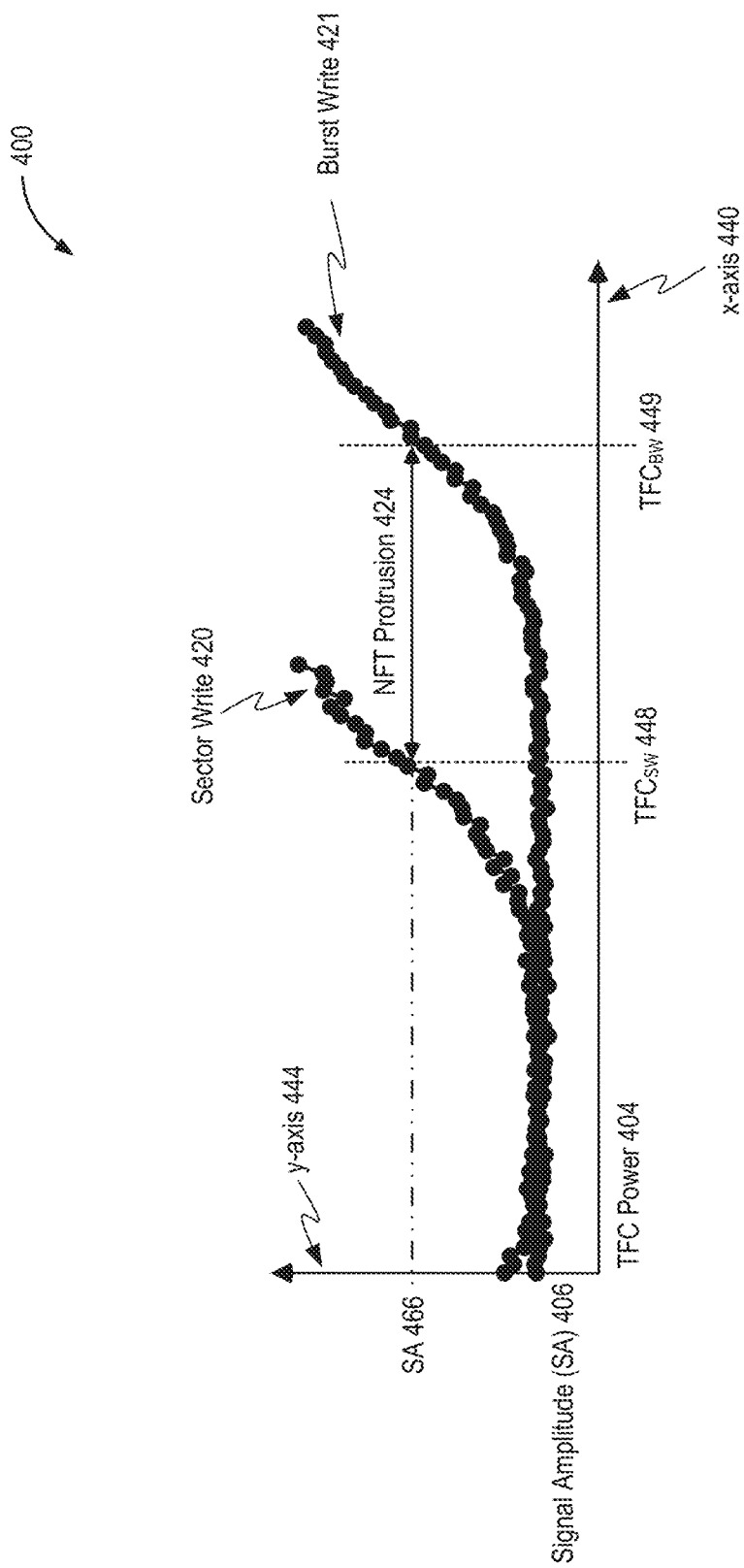
FIG. 4 is a conceptual graph showing signal amplitude against thermal fly-height control (TFC) power for a sector write mode and a burst write mode, as well as the near field transducer (NFT) protrusion measured using the difference in TFC power between the two modes, in accordance with one or more implementations.

Turning now to FIG. 4, which shows a conceptual graph 400 of signal amplitude 406 against TFC power 404 for two different NFT protrusion conditions, according to various aspects of the disclosure. In this example, signal amplitude 406 (e.g., written or read signal amplitude 406) is shown along the vertical or y-axis 444 and TFC power 404 is shown along the horizontal or x-axis 440. Graph 400 shows two traces, where a first trace 420 (or sector write trace 420) shows the relationship between signal amplitude and TFC power when in SW mode and a second trace 421 (burst write trace 421) shows the relationship between signal amplitude and TFC power when in BW mode.

As shown in FIG. 4, in some embodiments, the NFT protrusion 424 can be determined based on the difference in TFC power between the BW 421 and the SW 420 for the same written signal amplitude. For instance, when the signal amplitude is SA 466, the TFC power for SW 420 is $TFC_{SW}$ 448 and the TFC power for BW 421 is $TFC_{BW}$ 449. In such cases, the NFT protrusion 424 can be determined based on the difference $TFC_{BW}$ 449-$TFC_{SW}$ 448.

Figure 5:
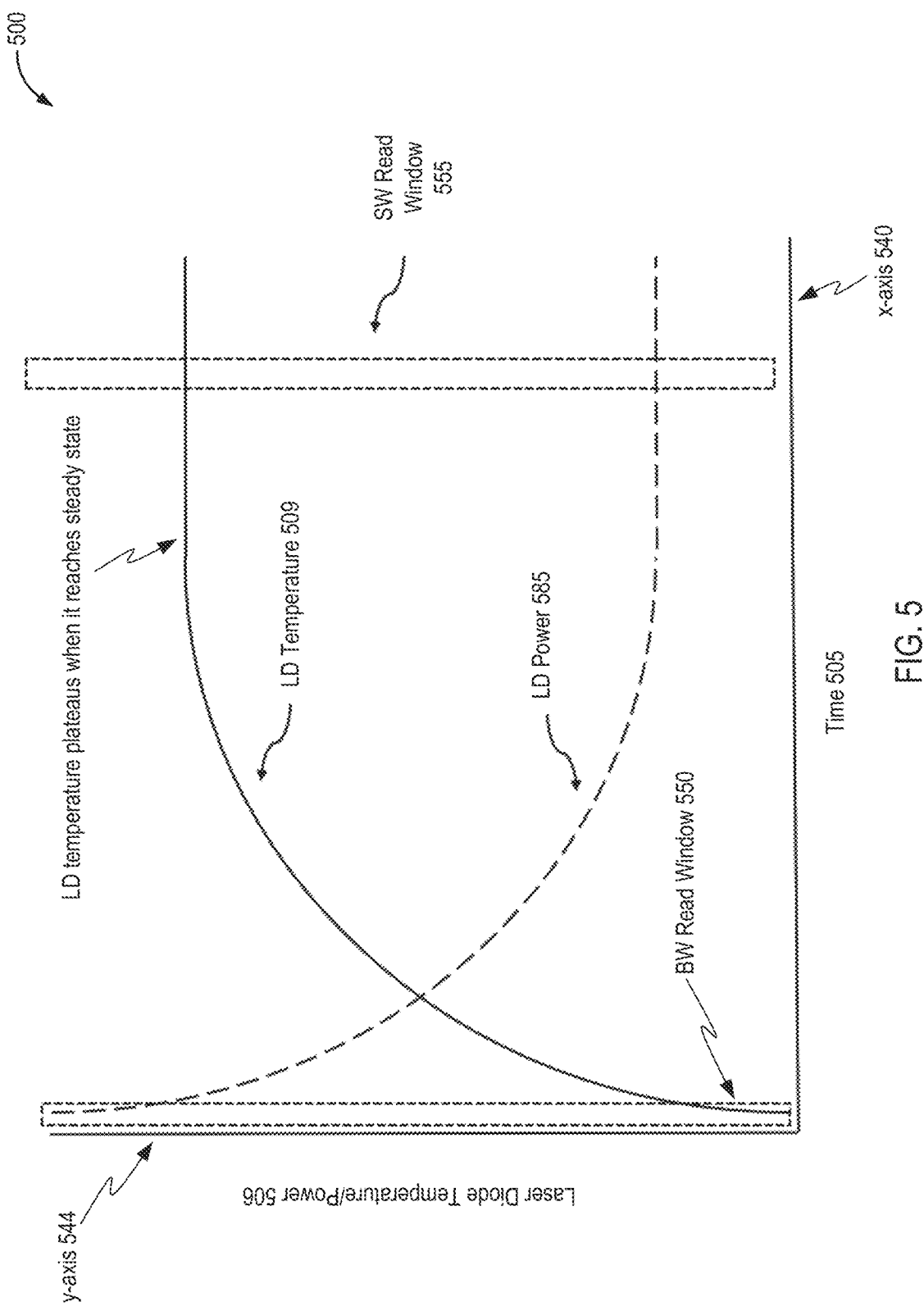
FIG. 5 is a conceptual graph showing delta LD temperature against time, as well as example read windows for the burst write and sector write modes, in accordance with one or more implementations.

FIG. 5 is a conceptual graph 500 showing delta LD temperature 506 (on vertical or y-axis 544) against time 505 (on horizontal or x-axis 540), in accordance with one or more implementations. In some circumstances, the LD temperature takes some time (e.g., at least 1 rev, anywhere between 1-2 revs, to name two non-limiting examples) to reach a steady state temperature. FIG. 5 depicts a LD temperature 509 trace showing the steep rise and subsequent plateauing of the LD temperature during a write operation. FIG. 5 also depicts an example of a BW read window 550 and a SW read window 555. Since the burst writes are of a significantly shorter duration than the sector writes (e.g., <200 ns for burst writes vs>100 μs for sector writes), the BW read window 550 occurs before the SW read window(s) 555. Specifically, the BW read window 550 occurs when the LD temperature has just started rising and when the LD temperature is significantly lower (e.g., anywhere between 5-20 degrees Celsius lower) than the steady state LD temperature. Furthermore, the SW read window 555 may occur after the BW read window 550 and when the LD temperature is higher than the LD temperature during the BW read window 550. In this example, the SW read window 555 occurs when the LD temperature is roughly equal to the steady state LD temperature.

As seen in FIG. 5, it takes some time (e.g., at least 1 rev) for the LD to reach steady state temperature. In such cases, the laser power corresponding to the burst writes may not match the laser power corresponding to the sector writes, since laser power is inversely proportional to the LD temperature for the same laser current. Specifically, for the same laser current, an increase in LD temperature corresponds to a decrease in LD power and a decrease in the written signal amplitude. Accordingly, to alleviate some of the discrepancies/issues in NFT protrusion measurements gathered using existing BWS and alternate techniques (e.g., NTS), where the discrepancies primarily arise from the inconsistent LD temperature and/or laser power utilized during the sector writes and burst writes, aspects of the present disclosure are directed to a refined BWS technique where the burst writes and the sector writes are performed at a constant or substantially constant LD temperature (e.g., target or steady state temperature), described in further detail below.

In some cases, during HAMR BWS, the LD can be preheated using a variety of techniques, such as but not limited to, dark laser heating (DLH), applying a reverse bias to the LD, using a dedicated heating element (e.g., heater 157 in FIGS. 1B-C), or any other applicable techniques known and/or contemplated in the art. Such a design can facilitate preheating the LD such that NFT protrusion is measured at a constant LD temperature and when the written amplitudes of the burst and sector writings are also in steady state. As noted above, this may help minimize or reduce the discrepancies between the NFT protrusion measurements determined using BWS and NTS (or any other applicable technique, such as multiple touchdown or MTD). In some embodiments, aspects of the present disclosure are also directed to determining an NPTP correction factor, which can be utilized to determine the actual NFT protrusion in the event that a constant LD temperature was not utilized to measure the NFT protrusion using BWS.

In some embodiments, the LD can be preheated by applying a reverse bias (RB) or negative voltage to the LD, where the RB is (1) low enough to heat the LD and enable it to attain the target or steady state temperature within an appropriate length of time, and (2) above an avalanche or breakdown voltage of the LD to prevent damaging the LD. In some cases, reverse biasing the LD can serve to pre-heat the LD without generating optical or laser emissions from the LD, which can help prevent unintended data writing and/or erasure of previously written data on the disk/media.

FIGS. 6A, 6B, 6C, and 6D show conceptual graphs 601, 602, 603, and 604, respectively, according to various aspects of the disclosure. Each of graphs 601 through 604 show signal amplitude (SA) against TFC power, where the SA is shown along the vertical or y-axis 654 and TFC power 644 is shown on the horizontal or x-axis 640.

Here, FIG. 6A depicts the relation between SW Signal Amplitude 606 (or $SA_{SW}$ 606) and TFC power 644 during sector write and when the LD temperature is in steady state, while FIG. 6B depicts the relation between BW Signal Amplitude 616 (or $SA_{BW}$ 616) and TFC power 644 during burst write and when the LD temperature is in steady state. Furthermore, FIGS. 6C and 6D depict the relation between SW Signal Amplitude 626 (or $SA_{SW}$ 626) and BW Signal Amplitude 636 (or $SA_{BW}$ 636), respectively, and TFC power 644 during sector write and burst write, respectively, and when the LD temperature is not in steady state.

As noted above, in some embodiments, a negative voltage (or RB) may be applied to the LD prior to performing the burst writes and/or sector writes, where applying the RB serves to preheat the LD to the steady state or target temperature. In some aspects, by preheating the LD to the steady state temperature, the written amplitude will also be in steady state. Furthermore, with a steady state recording, the BWS measurements are more closely aligned with the actual physical spacing, which can help optimize HDD performance, as compared to the prior art. In some examples, the amount of RB applied may be below a pre-defined threshold voltage but above the avalanche or breakdown voltage of the LD. In one non-limiting example, the RB may be at or around −17V, however other RB values (e.g., −16V, −15V, etc.) are also contemplated in different embodiments. For example, the RB applied to the LD may be selected based on one or more applicable characteristics (e.g., breakdown voltage) of the LD, the LD driver used to drive the LD, to name a few non-limiting examples.

As shown, FIG. 6A depicts traces 661 (RB below threshold) and 662 (no RB) of the SA against TFC power, while FIG. 6B depicts traces 663 (RB below threshold) and 664 (no RB) of the SA against TFC power. In this case, the LD temperature may be in steady state when the RB is applied (i.e., trace 661). Furthermore, FIGS. 6A and 6B show the difference (666-a) in TFC power between SW and BW for the same written or read signal amplitude, and when the LD temperature is in steady state (e.g., LD is reverse biased). Additionally, FIGS. 6A and 6B show the difference (666-b) in TFC power between SW and BW for the same signal amplitude (i.e., written or read signal amplitude), and when the LD temperature is not in steady state (e.g., LD is not reverse biased). In this way, the change in NPTP 669 (also referred to as NPTP correction factor 669) can be determined from TFC difference 666-a and TFC difference 666-b. For example, in some embodiments, the correction factor 669 can be determined by subtracting TFC difference 666-b from TFC difference 666-a, i.e., by calculating TFC difference 666-a minus TFC difference 666-b. In some instances, the correction factor 669 may be anywhere in the range from 1 mW to 10 mW, for example, 3 mW, around 4.5 mW, between 5-6 mW, to name a few non-limiting examples.

It should be noted that, this change in NPTP 669 (or correction factor 669) may be specific to the read/write head. In other words, different heads may be associated with slightly different correction factors, for example, due to minor variations in their NFT, laser units, waveguide, heaters, and/or TFC elements, where such variations may arise during the manufacturing process. In such cases, an NPTP correction factor 669 may be determined for each head of a HAMR drive, e.g., during the manufacturing phase, and the NPTP correction factor(s) 669 may be stored in a look-up table (or another data structure) in one or more of the FW, preamp control, control circuitry 22, and/or SoC 101 for later retrieval during normal disk drive operation. In some other cases, an NPTP correction factor 669 (also shown as change in NPTP 869 in FIG. 8) may be determined for a set of heads during the manufacturing phase of the HAMR drive (e.g., heads 1 through 4 (not shown) may be associated with a first correction factor, heads 5 through 8 (not shown) may be associated with a second, different correction factor), and these correction factors may be stored in a look-up table (or another applicable data structure) and retrieved during disk drive operation.

Turning now to FIGS. 6C and 6D, which depict the relation between SA and TFC power during sector write and burst write, respectively, and when the LD is not in steady state. Specifically, but without limitation, the graphs 603 and 604 show the effects (or lack thereof) on TFC power when no RB is applied (i.e., LD temperature is not in steady state) and when the LD is reverse biased, but the RB is above the pre-defined threshold. For instance, in some example embodiments, the RB threshold that is needed to pre-heat the LD such that it reaches the steady state or target temperature may be around −17V. In this example, if the RB applied to the LD is above −17V, for instance, around −10V, it may not be sufficient to heat the LD temperature to the steady state temperature.

For example, FIG. 6C shows a first trace 675 (no RB) and a second trace 676 (RB above a threshold that does not result in preheating the LD to the steady state temperature) corresponding to the SW mode. Similarly, FIG. 6D shows a third trace 685 (no RB) and a fourth trace 686 (RB above a threshold that does not result in preheating the LD to the steady state temperature) corresponding to the BW mode. In such cases, and as shown in graphs 603 and 604, if the RB applied to the LD is not sufficiently low to enable heating of the LD (e.g., if the RB applied to the LD is above the pre-defined RB threshold), there is little to no effect on SW and/or BW (i.e., in contrast to FIGS. 6A-B which allow determination of the change in NPTP or correction factor 669).

Figure 7:
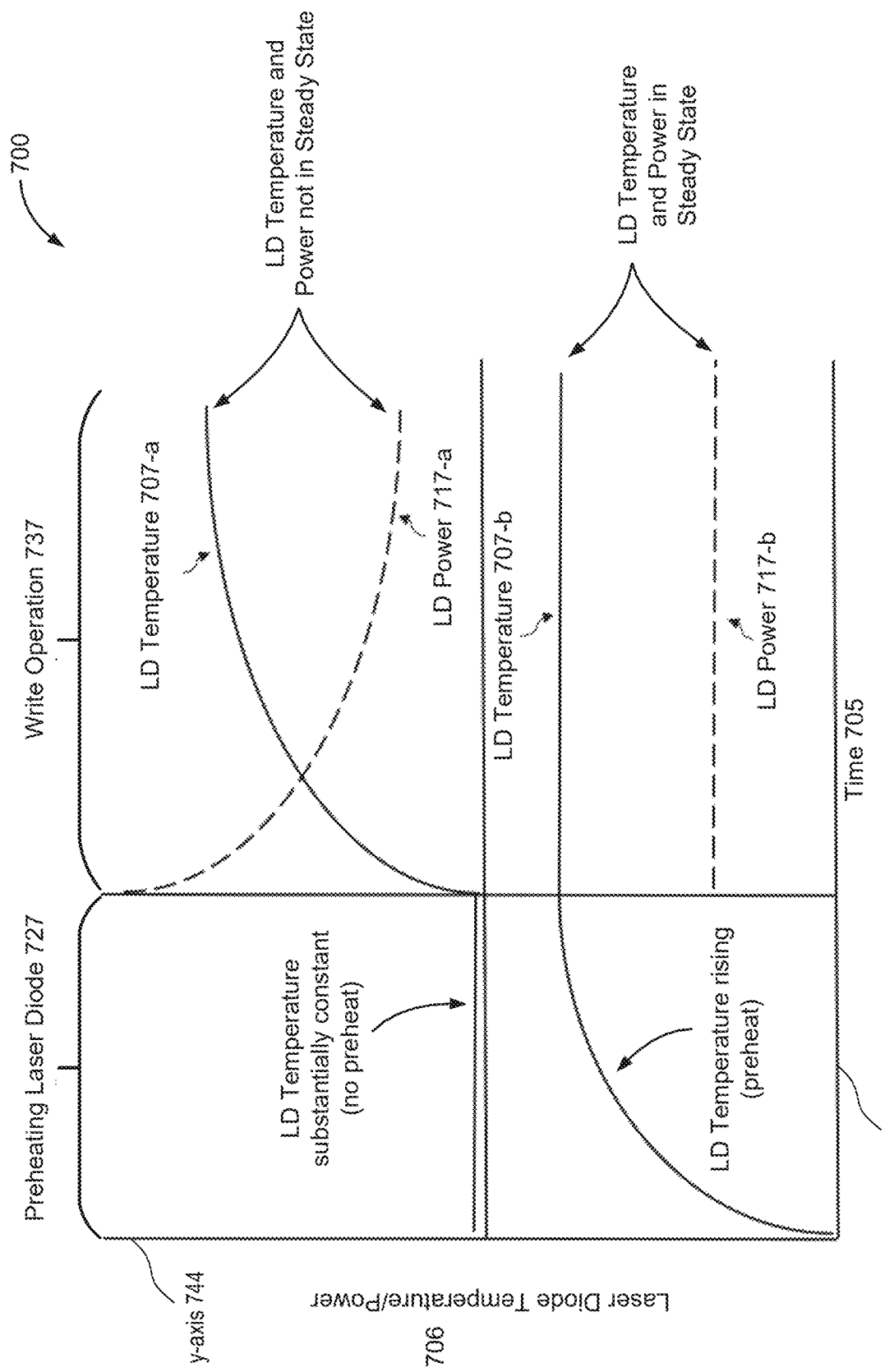
FIG. 7 is a conceptual graph showing laser diode temperature and power against time, when the laser diode is preheated as compared to when the laser diode is not preheated, in accordance with one or more implementations.

FIG. 7 illustrates a conceptual graph 700 showing both laser diode temperature and laser diode power (706) against time 705 when the laser diode is preheated (e.g., by applying a reverse bias) and when the laser diode is not preheated, in accordance with one or more implementations. In this example, the laser diode temperature/power 706 are shown along the vertical or y-axis 744 and time 705 is shown along the horizontal or x-axis 740. Furthermore, FIG. 7 depicts a first trace (LD temperature 707-*a*) and a second trace (LD power 717-*a*), showing the inverse relationship between the LD temperature and the LD power during write operation 737 when the laser diode is not preheated (i.e., LD temperature does not increase during the preheating laser diode 727 duration). FIG. 7 also depicts a third trace (LD temperature 707-*b*) and a fourth trace (LD power 717-*b*) showing the steady-state nature of both the LD temperature and LD power during the write operation 737 duration as a result of preheating the LD (i.e., LD temperature increases during the preheating laser diode 727 duration until it reaches a steady-state temperature associated with the write operation).

Figure 8:
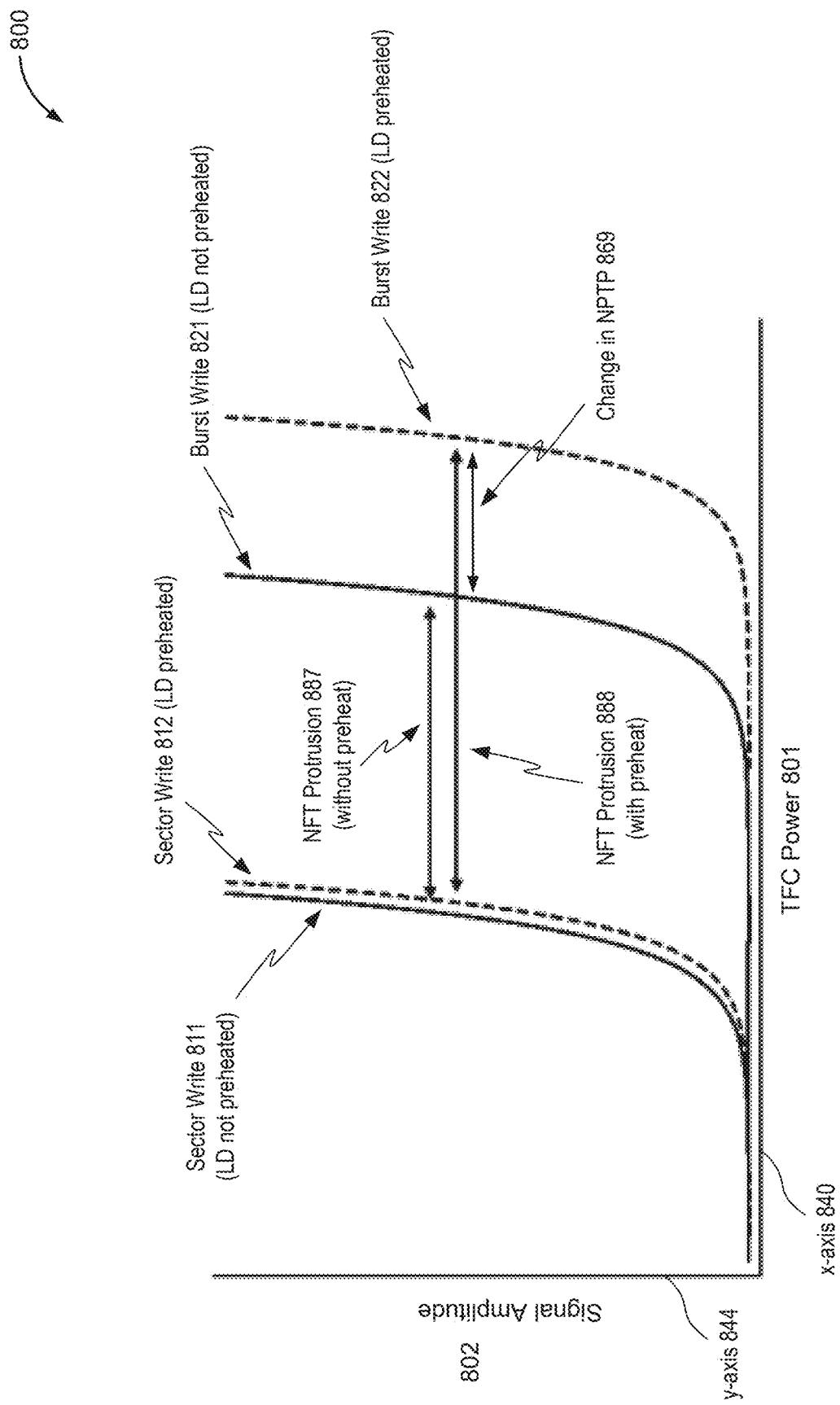
FIG. 8 is a conceptual graph showing signal amplitude against TFC power for a sector write mode and a burst write mode, when no reverse bias is applied as compared to when a reverse bias is applied such that the LD temperature is in steady state, according to various aspects of the present disclosure.

FIG. 8 illustrates a conceptual graph 800 showing signal amplitude (SA) 802 against TFC power 801, where the SA 802 is shown along the vertical or y-axis 844 and TFC power 801 is shown on the horizontal or x-axis 840, according to various aspects of the present disclosure. In this example, FIG. 8 shows a first trace 811 (sector write or SW trace when LD is not preheated), a second trace 812 (SW trace when LD is preheated), a third trace 821 (burst write or BW trace when LD is not preheated), and a fourth trace 822 (BW trace when LD is preheated). FIG. 8 also shows the NFT protrusion when the LD is not preheated (trace 887) and when the LD is preheated (trace 888). As seen, the BW trace 822 is shifted (along the horizontal or x-axis 840) as compared to BW trace 821, since the laser power and/or laser temperature corresponding to BW trace 821 are not in steady-state (i.e., since the laser diode is not preheated). Contrastingly, there is minimal to no shift between SW traces 811 and 812 since the laser power and/or laser temperature are stable (or substantially stable) since sector writes are of a sufficient duration to cause the NFT protrusion to be in steady-state. Thus, in some aspects, the NFT protrusion measurement 888 (with preheat) is a more accurate representation of the NFT protrusion measurement (NPTP), since this NFT protrusion measurement is determined when both the sector writes and burst writes are written in a stable (or substantially stable) laser power condition. Said another way, the NFT protrusion measurement 887 (without preheat) may not be an accurate representation of the NFT protrusion measurement, since the laser power and/or temperature for the BW is not in steady state. Similar to FIGS. 6A-6D, the graph 800 also shows the change in NPTP 869, which is the difference between the NFT protrusion measurement 888 (with preheat, such as by applying a reverse bias to the LD) and the NFT protrusion measurement 887 (without preheat).

While this disclosure generally describes applying a reverse bias to preheat the LD to the steady state temperature such that the burst writes and sector writes are associated with the same or similar LD temperature, laser power, written amplitude, etc., this is not intended to be limiting. In other words, other techniques, besides RB, for achieving a constant laser diode temperature are contemplated in different embodiments and the examples listed herein are not intended to limit the scope and/or spirit of the present disclosure. For example, in some embodiments, an NFT protrusion measurement using BWS may employ a dark laser heating (DLH) technique to heat the LD temperature to the target or steady state temperature, which allows the sector writes and burst writes to be performed using the same or substantially the same LD temperature, thereby avoiding issues associated with LD temperature transients, which can also help enhance HDD reliability by providing a more accurate calibration of head-to-disk spacing. In some other cases, NFT protrusion measurement using BWS may involve applying a pre-bias to preheat the LD to the target or steady state temperature, which also allows measuring NFT protrusion at a constant LD temperature, in accordance with various aspects of the disclosure. Other techniques known and/or contemplated in the art for preheating the LD to the steady state temperature, e.g., using a dedicated heater, such as heater 157, can also be utilized in different embodiments without departing the scope and/or spirit of the present disclosure.

As can be appreciated, preheating the LD to an appropriate temperature (e.g., steady state temperature) enables the written amplitudes associated with the first series of writings (e.g., burst writes) and second series of writings (e.g., sector writes) to be in steady state. Furthermore, with a steady state recording, the NFT protrusion measurement using BWS (i.e., simpler, cheaper, and/or less complex to implement) will be closer to the actual physical spacing (e.g., measured using NTS, which may be more difficult and/or complex to implement). In this way, aspects of the present disclosure facilitate in optimizing HAMR drive performance by providing an improved technique for determining HAMR HDD spacing, as compared to the prior art.

It should be noted that one or more aspects of the present disclosure can be implemented using firmware (FW) control or internal preamp control. Furthermore, in some cases, aspects of the present disclosure may require minimal to no hardware (HW) modifications and may primarily involve modifications to the FW and/or preamp control. In yet other cases, aspects of the present disclosure may be implemented using modifications to the HW, FW, and/or preamp control.

Any suitable control circuitry (e.g., control circuitry 22 in FIG. 2A) may be employed to implement the flow diagrams (e.g., method 80 in FIG. 2C) in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or SoC (e.g., SoC 101 in FIG. 1B). In addition, control circuitry 22 may include a preamp circuit implemented as a separate integrated circuit, integrated into the read channel or data storage controller circuit, or integrated into the SoC.

In some examples, the control circuitry, such as, but not limited to, control circuitry 22, comprises a microprocessor executing instructions, the instructions being operable to cause the microprocessor to perform any of the process flows and/or methods described herein, including, but not limited to, method 80 in FIG. 2C. The instructions may be stored in any computer-readable medium. In some examples, they may be stored on a non-volatile semiconductor memory device, component, or system external to the microprocessor, or integrated with the microprocessor in the SoC 101. In some examples, the instructions are stored on the disk and read into a volatile semiconductor memory when the disk drive is powered on. In some examples, the control circuitry 22 comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute control circuitry 22 as described herein and may perform one or more of the functions of control circuitry 22 as described herein. In various examples, control circuitry 22, or another processing device performing one or more of the functions of control circuitry as described herein, may be abstracted away from being physically proximate to the disks and disk surfaces. The control circuitry, or another processing device performing one or more of the functions of control circuitry as described herein, may be part of or proximate to a rack of or a unitary product comprising multiple data storage devices, may be part of or proximate to one or more physical or virtual servers, may be part of or proximate to one or more local area networks or one or more storage area networks, may be part of or proximate to a data center, or may be hosted in one or more cloud services.

In various examples, a disk drive, such as disk drive 15, may include a magnetic disk drive (e.g., employing heat assisted magnetic recording or HAMR), an optical disk drive, a hybrid disk drive, or other types of disk drives. In addition, some examples may include electronic devices such as computing devices, data server devices, media content storage devices, or other devices, components, or systems that may comprise the storage media and/or control circuitry described above.

The various features and processes described above may be used independently of one another or may be combined in various ways. All possible combinations and subcombinations are intended to fall within the scope of this disclosure. In addition, certain method, event or process blocks may be omitted in some implementations. The methods (e.g., method 80 in FIG. 2C) and processes described herein are not limited to any particular sequence, and the blocks or states relating thereto can be performed in other sequences. For example, tasks or events may be performed in an order other than that specifically disclosed, or multiple tasks or events may be combined in a single block or state. The tasks or events may be performed in serial, in parallel, or in another manner. Tasks or events may be added to or removed from the disclosed examples. The systems and components described herein may be configured differently than described. For example, elements may be added to, removed from, or rearranged compared to the disclosed examples.

While certain embodiments are described herein, these embodiments are presented by way of example only, and do not limit the scope of this disclosure. Nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of this disclosure.

Any of the method(s) described herein may include other steps or variations in various other embodiments. Some or all of the method(s) described herein may be performed by or embodied in hardware, or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for measuring NFT Protrusion in a HAMR drive using burst writing and a constant laser diode temperature. Those of skill in the art will be well-equipped by this disclosure with an understanding and an informed reduction to practice of a wide panoply of further applications, architectures, techniques, and methods for measuring NFT Protrusion in a HAMR drive using burst writing and a constant laser diode temperature, and other aspects of this disclosure encompassed by the present disclosure and by the claims set forth below.

As used herein, the recitation of "at least one of A, B and C" is intended to mean "either A, B, C or any combination of A, B and C." The disclosed examples are provided to enable any person skilled in the relevant fields of art to understand how to make or use the subject matter of this disclosure. Various modifications to these embodiments will be readily apparent to those skilled in the art based on this disclosure, and the generic principles defined herein may be applied to other examples without departing from the spirit or scope of this disclosure. Thus, this disclosure is not limited to the embodiments shown herein but is to be accorded the widest scope consistent with the principles and novel features disclosed herein.

This disclosure and many of its attendant advantages will be understood by the foregoing description, and various changes may be made in the form, construction, and arrangement of the components without departing from the disclosed subject matter or without sacrificing its material advantages. The form described is merely explanatory, and the following claims encompass and include a wide range of embodiments, including a wide range of changes in the form, construction, and arrangement of components as described herein.

While this disclosure has been described with reference to various examples, these examples are illustrative, and the scope of the disclosure is not so limited. The subject matter described herein is presented in the form of illustrative, non-limiting examples, and not as exclusive implementations, whether or not they are explicitly called out as examples as described. Many variations, modifications, and additions are possible within the scope of the examples of the disclosure. More generally, examples in accordance with this disclosure have been described in the context of particular implementations. Functionality may be separated or combined in blocks differently or described with different terminology, without departing from the spirit and scope of this disclosure and the following claims. These and other variations, modifications, additions, and improvements may fall within the scope of this disclosure as defined in the following claims.

The invention claimed is:

1. A data storage device configured for heat assisted magnetic recording (HAMR), the data storage device comprising:
    one or more disks;
    one or more heads, including at least, a first head having a first laser diode (LD) and a near field transducer (NFT); and
    one or more processing devices or components, configured, individually or in combination, to:
        preheat the first LD to a steady state temperature;
        after the preheating,
            write, using the first head, a first series of writings at a plurality of thermal fly-height control (TFC) powers;
            write, using the first head, a second series of writings at the plurality of TFC powers, wherein the first series of writings are of a shorter duration than the second series of writings; and
        determine, for the first head, an NFT protrusion measurement based at least on a difference in TFC power used between (1) one of the first of writings and (2) one of the second series of writings, at a corresponding written signal amplitude.

2. The data storage device of claim 1, wherein the first series of writings comprise burst writings, and the second series of writings comprise sector writings.

3. The data storage device of claim 1, wherein,
    the first series of writings are each under 200 nanoseconds (ns) long, and
    the second series of writings are each at least 100 microseconds (μs) long.

4. The data storage device of claim 3, wherein each writing of the first series of writings is performed for a shorter duration than one or more of a protrusion time constant for the NFT of the first head and a gas bearing surface (GBS) response time, wherein the GBS response time corresponds to a time required for the GBS to reach steady-state fly height.

5. The data storage device of claim 1, wherein preheating the first LD comprises preheating the first LD using dark laser heating (DLH).

6. The data storage device of claim 1, wherein preheating the first LD comprises applying a reverse bias (RB) to preheat the first LD.

7. The data storage device of claim 1, wherein preheating the first LD to the steady state temperature reduces or minimizes effects of LD temperature transients on one or more written signal amplitudes corresponding to each of the first and the second series of writings.

8. The data storage device of claim 1, further comprising one or more additional LDs, including at least a second LD associated with a second head, and wherein the one or more processing devices or components are further configured, individually or in combination, to:
    preheat the second LD to the steady state temperature;
    write, using the second head, a third series of writings at the plurality of TFC powers, based at least in part on preheating the second LD;
    write, using the second head, a fourth series of writings at the plurality of TFC powers, based at least in part on preheating the second LD; and
    determine, for the second head, an NFT protrusion measurement based at least in part on a difference in TFC power used between (1) one of the third series of writings, and (2) one of the fourth series of writings, at a corresponding written signal amplitude.

9. The data storage device of claim 8, wherein:
    the first series of writings and the third series of writings comprise burst writings,
    the second series of writings and the fourth series of writings comprise sector writings,
    the first series of writings have a shorter duration than the second series of writings, and
    the third series of writings have a shorter duration than the fourth series of writings.

10. A method of operating a data storage device utilizing heat assisted magnetic recording (HAMR), the method comprising:
    preheating a first laser diode (LD) to a steady state temperature, wherein the first LD is associated with a first head of the data storage device, the first head comprises a near field transducer (NFT);
    after the preheating,
        writing, using the first head, a first series of writings at a plurality of thermal fly-height control (TFC) powers;
        writing, using the first head, a second series of writings at the plurality of TFC powers, wherein the first series of writings are of a shorter duration than the second series of writings; and
    determining, for the first head, an NFT protrusion measurement based at least on a difference in TFC power used between (1) one of the first of writings and (2) one of the second series of writings, at a corresponding written signal amplitude.

11. The method of claim 10, wherein the first series of writings comprise burst writings, and where the second series of writings comprise sector writings.

12. The method of claim 10, wherein,
    the first series of writings are each under 200 nanoseconds (ns) long, and
    the second series of writings are each at least 100 microseconds (μs) long.

13. The method of claim 12, wherein each writing of the first series of writings is performed for a shorter duration than one or more of a protrusion time constant for the NFT of the first head and a gas bearing surface (GBS) response time, wherein the GBS response time corresponds to a time required for a GBS to reach steady-state fly height.

14. The method of claim 10, wherein preheating the first LD comprises preheating the first LD using dark laser heating (DLH).

15. The method of claim 10, wherein preheating the first LD comprises applying a reverse bias (RB) to preheat the first LD.

16. The method of claim 10, wherein preheating the LD reduces or minimizes effects of LD temperature transients on one or more written signal amplitudes corresponding to the first series of writings.

17. The method of claim 16, wherein preheating the LD further reduces or minimizes effects of LD temperature transients on the one or more written signal amplitudes corresponding to the second series of writings.

18. The method of claim 10, wherein the data storage device further comprises one or more additional LDs, including at least a second LD associated with a second head, the method further comprising:
preheating the second LD to the steady state temperature;
writing, using the second head, a third series of writings at the plurality of TFC powers, based at least in part on preheating the second LD;
writing, using the second head, a fourth series of writings at the plurality of TFC powers, based at least in part on preheating the second LD, and wherein the third series of writings are of a shorter duration than the second series of writings; and
determining, for the second head, an NFT protrusion measurement based at least in part on a difference in TFC power used between (1) one of the third series of writings, and (2) one of the fourth series of writings, at a corresponding written signal amplitude.

19. The method of claim 18, wherein:
the first series of writings and the third series of writings comprise burst writings, and
the second series of writings and the fourth series of writings comprise sector writings.

20. One or more processing devices or components, comprising:
means for preheating a first laser diode (LD) of a data storage device to a steady state temperature, wherein the first LD is associated with a first head of the data storage device, and wherein the data storage device is configured for heat assisted magnetic recording (HAMR);
after the preheating,
means for writing, using the first head, a first series of writings at a plurality of thermal fly-height control (TFC) powers;
means for writing, using the first head, a second series of writings at the plurality of TFC powers, wherein the first series of writings have a shorter duration than the second series of writings; and
means for determining, for the first head, an NFT protrusion measurement based at least on a difference in TFC power used between (1) one of the first of writings and (2) one of the second series of writings, at a corresponding written signal amplitude.

* * * * *